United States Patent
Terada et al.

[11] Patent Number: 5,805,943
[45] Date of Patent: Sep. 8, 1998

[54] FILM AUTO-LOADING DEVICE OF A CAMERA

[75] Inventors: Hiroshi Terada, Mitaka; Hiroaki Furuya, Hachioji, both of Japan

[73] Assignee: Olympus Optical Co., Ltd., Tokyo, Japan

[21] Appl. No.: 831,676

[22] Filed: Apr. 10, 1997

[30] Foreign Application Priority Data

Apr. 19, 1996 [JP] Japan .................................. 8-098577

[51] Int. Cl.$^6$ .................................................. G03B 1/00
[52] U.S. Cl. ........................... 396/411; 396/413; 396/418
[58] Field of Search .................................. 396/310, 319, 396/387, 411, 413, 415, 418

[56] References Cited

U.S. PATENT DOCUMENTS

| | | | |
|---|---|---|---|
| 4,589,604 | 5/1986 | Yagi et al. | 396/411 |
| 5,091,740 | 2/1992 | Hori | 396/418 |
| 5,245,372 | 9/1993 | Aoshima | 396/319 |
| 5,434,633 | 7/1995 | Nagao et al. | 396/319 |
| 5,437,416 | 8/1995 | Ezawa et al. | 396/387 |
| 5,456,419 | 10/1995 | Ezawa | 396/418 |
| 5,555,050 | 9/1996 | Wakabayashi et al. | 396/406 |
| 5,610,677 | 3/1997 | Katagiri | 396/418 |

*Primary Examiner*—Eddie C. Lee
*Attorney, Agent, or Firm*—Louis Weinstein

[57] ABSTRACT

A camera capable of securing a more stable film loading operation and further of conducting a more stable information recording operation. The camera is equipped with a film loading motor (48), a film winding gear train, a film forwarding gear train and a clutch for releasing the transfer of a driving force of the motor (48) to the film forwarding gear train. When the reduction ratio of the film winding gear train is taken to be iW, the reduction ratio of the film forwarding gear train is taken to be iAL and the radius of the outermost portion of a spool shaft (56a) and spool rubber (56b) constituting a film take-up spool is taken as Rs (mm), the relationship among these values is determined as $(iAL/iW) \times Rs = \gamma$ where $\gamma \geq 13.6$. In addition, in this case, the value $\gamma$ satisfies $\gamma \geq 19.0$.

5 Claims, 13 Drawing Sheets

FILM AUTO-LOADING DEVICE OF A CAMERA

BACKGROUND OF THE INVENTION

1. Field of the Invention

The present invention relates to a camera, and more particularly to a camera which is made to concurrently perform the forwarding drive operation to forward a film from the interior of a film cartridge and the winding drive operation to wind the forwarded film around a take-up spool.

2. Related Background Art

So far, for a camera for photography or the like, there have been proposed and practiced various roll-film auto-loading mechanisms.

For example, in a camera or the like employing the 135 type film cartridge, in general a perforation of the tip portion of a roll film exposed in advance from the film accommodating cartridge is engaged with a camera side film forwarding sprocket so that a camera side film loading mechanism further draws out the roll film from the interior of the film cartridge, and when the film tip portion reaches a film take-up spool, through the use of a claw member formed on an outer circumferential portion of the film take-up spool, the roll film is forwarded toward the film take-up spool and wound around it.

On one hand, a structure recently proposed involves rolling and encasing the whole roll film including its tip portion in a cartridge. In this cartridge, a film forwarding mechanism or the like provided therein forwards the roll film in the cartridge to the exterior of the cartridge.

Furthermore, a structure proposed is that a magnetic information recording area or the like is provided on a surface of a film housed within the cartridge to magnetically record the information such as photography information. In addition, the so-called Advanced Photo System has been known which is based upon a camera or the like using this cartridge.

Even to the camera or the like for The Advanced Photo System, the above-mentioned prior film forwarding mechanism or the like is easily applicable.

In addition, for the size reduction of a camera or the like for photography or the like, there have been proposed various structures where a winding drive system, a rewinding drive system, a forwarding drive system for the film loading operation are driven through a single electric motor. In this case, it may be advantageous from a control point of view that the film initial forwarding operation and the winding operation are conducted as a series of operations but not made in separate sequences.

That is, in the case of making the processing as discontinuous processing in separate sequences in such a manner as to detect the arrival of a film tip portion at a film take-up spool after the film initial forwarding operation to stop an electric motor and subsequently to conduct the film winding operation by driving the spool side through any switching operation, it takes a long time when loading the film. In contrast to this case, when this series of operations are processed as one sequence, it is possible to shorten the time taken for loading the film.

However, in the case that the film initial forwarding operation and the film winding operation are controlled as a series of operations, the forwarding drive system is always in operation even during the film winding operation, and hence the clutch mechanism and others become necessary, with the result that an additional space for these mechanisms becomes necessary, which is undesirable in order to achieve size reduction of the camera.

Furthermore, in the case of setting a reduction ratio of the film forwarding drive system in order to surely and tightly wind the roll film around the film take-up spool, it is necessary that the reduction ratio of the film forwarding drive system is set to be larger than the reduction ratio of the film winding drive system. Accordingly, in the case that the forwarding drive system and the rewinding drive system are common, there is a problem in that the time taken for the rewinding operation becomes long.

On the other hand, for shortening the rewinding time, a rewinding drive system with a different reduction ratio needs to be newly provided, which is disadvantageous in the size reduction of the camera.

Moreover, in cases where in a camera or the like for the above-mentioned Advanced Photo System the information recording or the like is made in the magnetic information recording area or the like formed on a film surface during the film feeding operation, it is necessary to perform the film feeding operation at a more stable speed.

Even if in a camera using the prior 135 type film cartridge the film is wound to slightly inflate during the film loading operation, there is no problem on the film loading as long as the film is made to be gradually tightened during the film loading operation. However, in the case of the camera to be used for The Advanced Photo System, it creates large variation of the film loading speed, which makes the information recording operation unstable.

For this reason, from the initial stage of the film loading it is necessary that the roll film is surely and closely wound around the outer circumferential surface of the film take-up spool.

SUMMARY OF THE INVENTION

Accordingly, it is a main object of the present invention to provide a camera for The Advanced Photo System which is capable of securing a stable film loading operation and of accomplishing a more stable information recording operation.

Another object of this invention is to provide a camera for The Advanced Photo System which is capable of contributing to its size reduction concurrently with securing the stable film loading operation and achieving a more stable information recording operation.

Briefly, a camera according to this invention comprises a film loading motor, a film winding gear train, a film forwarding gear train, a clutch for releasing transfer of a driving force of the motor to the film forwarding gear train, and a film take-up spool driven by the film winding gear train, wherein the relationship between the reduction ratio of the film winding gear train and the reduction ratio of the film forwarding gear train is set as follows:

$$(iAL/iW) \times Rs = \gamma\gamma \geq 13.6$$

where iW represents the reduction ratio of the film winding gear train, iAL designates the reduction ratio of the film forwarding gear train, and Rs denotes the radius (mm) of the film take-up spool.

In addition, the γ value is set to $\gamma \geq 19.0$.

Furthermore, a film loading device of a camera which simultaneously operates a forwarding drive for forwarding a film from the interior of a film cartridge and a winding drive for winding the forwarded film around a take-up spool is provided with a one-way clutch which transfers a driving force of the forwarding drive to the film cartridge at the film forwarding and releases the transfer thereof at the film winding, and when a film forwarding speed is taken to be VAL and a winding speed at the start of the film winding is taken as VW, the relationship between the film forwarding speed and the film winding speed at the start of the film winding is set as follows:

$$VW/VAL = \delta\delta \geq 1.6$$

In addition, the δ value is set to $\delta \geq 2.2$.

This and other objects and advantages of the present invention will become further apparent from the following detailed explanation.

In accordance with the present invention, there is provided a camera for The Advanced Photo System which is capable of securing a more stable film loading operation and hence of accomplishing a more stable information recording operation.

DETAILED DESCRIPTION OF THE PREFERRED EMBODIMENTS

The present invention will be described hereinbelow through the use of embodiments illustrated.

FIGS. 1 to 6 are illustrations of the appearance of a camera according to an embodiment of the present invention. The camera according to this embodiment agrees with the above-mentioned Advanced Photo System, and is the so-called photographing lens integrated type single-lens reflex camera where the photographing and a camera body are in an integrated relation to each other.

In addition, to the photographing lens of this camera there is applied a variable power zoom lens which is capable of continuously changing the focal length, with the variable focal length range being set, for example, to 25 mm to 100 mm.

Figure 1:
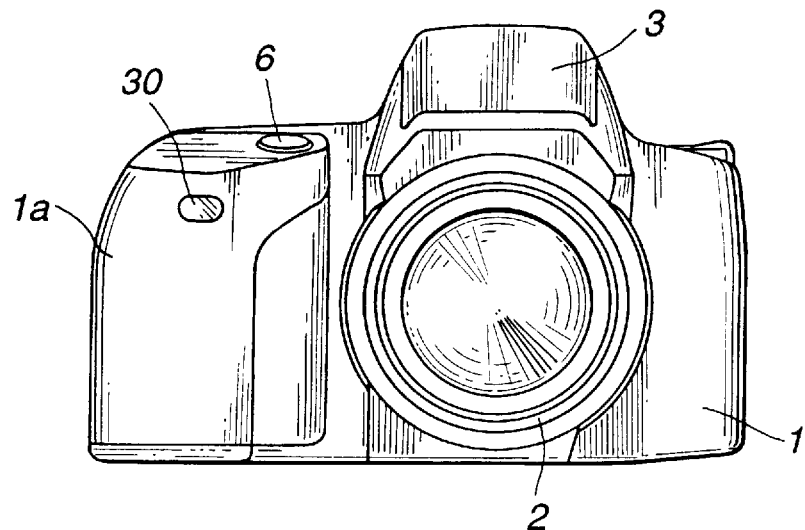
FIG. 1 is a front elevational view showing an outside shape of a camera according to an embodiment of the present invention.
Figure 2:
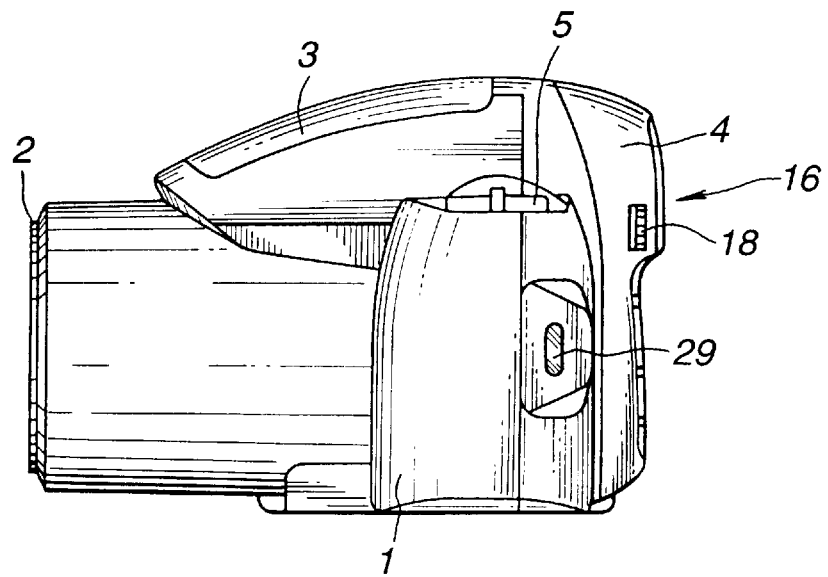
FIG. 2 is a right side elevational view showing the FIG. 1 camera.
Figure 4:
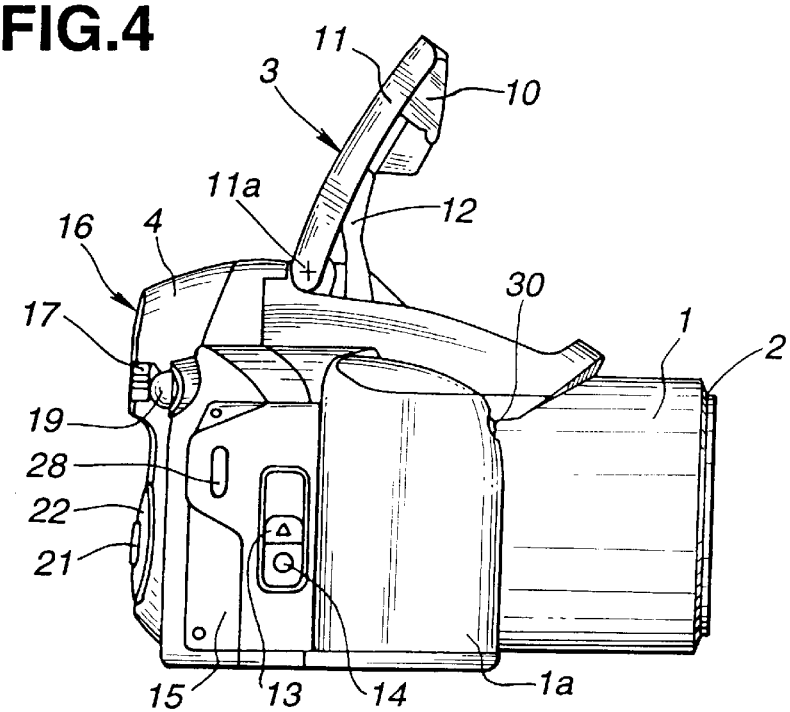
FIG. 4 is a left side elevational view showing the FIG. 1 camera, showing a state that a stroboscopic section is in a popped-up condition.

Furthermore, this camera incorporates a stroboscope device (electric flash equipment), and FIG. 2 shows a housed condition of the stroboscope device and FIG. 4 illustrates an emission allowed condition (popped-up state) thereof.

The aforesaid stroboscope device is provided with the so-called popping-up mechanism which makes the stroboscope protrusively take an emission position (pop up) when an auxiliary light beam is necessary, for example, when the photographing environment is a low-brightness environment.

As shown in FIGS. 1 to 6, the outside construction of this camera relies upon three blocks: a front cover 1, a rear cover 4 and a stroboscopic section 3.

The aforesaid front cover 1 is made to cover the front side of this camera, and at a generally central portion of the front surface, a cylindrical section protruding in front is formed to accept a photographing lens barrel 2 for holding a photographing lens and others. Further, the aforesaid rear cover 4 engages with the front cover 1 to cover the rear side of this camera.

Incidentally, since as mentioned before this camera is the type of allowing The Advanced Photo System, this camera is not equipped with a mechanism which opens and closes, through a rear cover or the like, an opening section made in a rear surface of a camera using a prior 135 type film cartridge or the like.

Furthermore, the aforesaid stroboscopic section 3 assumes the popped-up state in FIG. 4 and is composed of a stroboscopic emission section 10, for example, comprising a Xenon (Xe) tube, a reflector and others, and a stroboscopic cover 11. This stroboscopic section 3 is supported to be rotatable about a shaft portion 11a to above the front cover 1. More specifically, the stroboscopic section 3 is made to be rotatable about the shaft portion 11a acting as a rotating center through an angle of approximately 80 degrees to above this camera. In this case, two stroboscope arms 12 are placed on both end portions of the stroboscopic section 3, respectively, thus restricting the rotating movement and holding the stroboscopic section 3 at a given position at the time of the popped-up condition as shown in FIG. 4.

In terms of the illumination range of the stroboscopic emission section 10 in the popped-up state shown in FIG. 4, the illuminating angle is determined so that it can sufficiently illuminate the photographing range at the closest distance on the wide side (focal length: 25 mm).

Figure 3:
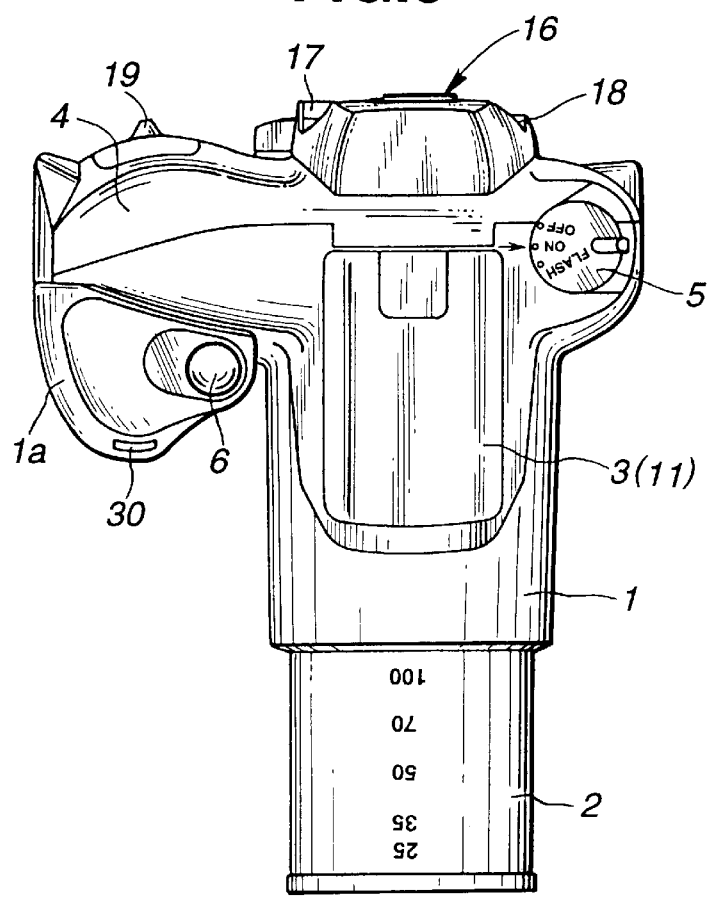
FIG. 3 is a top view showing the FIG. 1 camera, showing a state that a photographing lens is on a telephoto side.

Still further, a gripping section 1a for holding the camera at photography is provided on the left-hand side viewed from the front side of the camera, and as shown in FIG. 3 a shutter release button 6 is located at an upper and front side portion of the gripping section 1a and further an operating member such as a zoom lever 19 is situated on a rear side upper portion of the camera and even a remote control light-receiving section 30 for receiving an optical signal (for example, an infrared beam) from a remote control unit or the like is provided at an upper front side portion of the gripping section 1a.

On the other hand, as mentioned before a quadruple zoom lens having a focal length of 25 mm to 100 mm is applied to the photographing lens of this camera, and this photographing lens is held by the photographing lens barrel 2 fitted in the front side cylindrical section of the front cover 1.

Moreover, the aforesaid photographing lens is designed to freely set its focal length within the above-mentioned range in response to the arbitrary operation of the zoom lever 19. In this instance, the photographing lens barrel 2 is designed so that its overall length becomes larger in accordance with the variation of the focal length from the short focal point (wide) side to the long focal point (tele) side (see FIG. 3).

Furthermore, as shown in FIG. 3, provided at one end portion (a right side upper portion when viewed from the front side of the camera) on the top surface of the camera is a main switch 5 which is a main power supply switch of this camera. This main switch 5 assumes a dial configuration rotatably supported at a camera upper surface portion which is made to take an "OFF" position for setting the power supply condition to the camera to the off state, an "ON" position for establishing the power supply condition to the camera to the on state, a "FLASH" position for popping up the aforesaid stroboscopic section 3 toward the emission position and further for allowing the stroboscopic emission, and other positions. The switching to the respective positions is accomplished through the rotating operation of the main switch 5.

In the case of shifting the stroboscopic section 3 from its popped-up state (the state shown in FIG. 4) to its housed state (the state shown in FIGS. 1, 2 and 3), for example the stroboscopic section 3 is arbitrarily manually pressed toward the top surface side of the front cover 1 of the camera.

Figure 6:
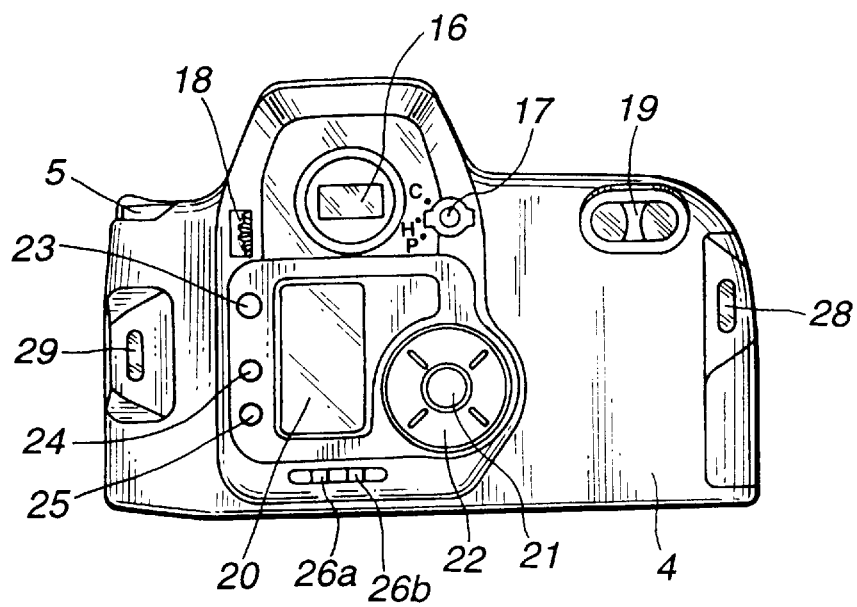
FIG. 6 is a back elevational view showing the FIG. 1 camera.

On the other hand, as shown in FIG. 6 various operating members and others are disposed in the rear surface side of this camera. That is, on an upper side of the generally central portion there is provided an eye-piece section 16 comprising eye-piece lens or the like and available for confirming a subject image at photography or the like. Further, a diopter adjusting dial 18 for adjusting the diopter of the eye-piece lens system is provided on one end portion side (the left side when viewed from the rear surface side of the camera in FIG. 6) of the eye-piece section 16 but in the vicinity of the eye-piece section 16, while a scene switching operating member 17 is disposed on the other end portion side thereof.

This scene switching operating member 17 allows the selection and the switching to one of the three kinds of print types employed for The Advanced Photo System: an H type (HDTV) having an aspect ratio of approximately 9:16 which is a standard print size, a C type (Classic) having an aspect ratio of approximately 2:3 which is a conventional print size, and a P type (Panoramic) having an aspect ratio of approximately 1:3 which is a panoramic size. When the scene switching operating member 17 is rotated clockwise in FIG. 6 by, for example, approximately 45 degrees on the basis of the "H" position indicative of the standard size, it reaches the "C" position indicative of the C type. On the other hand, when the scene switching operating member 17 is rotated counterclockwise in FIG. 6 by approximately 45 degrees on the basis of the "H" position indicative of the standard format, it reaches the "P" position representative of the P type. Accordingly, the visual field of a viewfinder observable from the eye-piece section 16 is selectable to agree with the respective types, and the print type set here is recorded on a film surface as a portion of photography information or the like at photography in link with an information recording control circuit (not shown) or the like in the camera.

Furthermore, under the eye-piece section 16 is an indication section 20 which is constructed with a liquid crystal display (LCD) or the like to indicate various information such as a film counter and a photographing mode. A mode selection button 22 for selection of a photographing mode is located on one end side (the right side when viewed from the rear surface side of the camera in FIG. 6) of the indication section 20 and in the vicinity of this indication section 20, while on the other end side (the left side when viewed from the rear surface side of the camera in FIG. 6) there are placed an emission mode selection button 23 for setting the stroboscopic emission condition from the above, a self remote control button 24 for setting the use of a remote control unit, the use of a self-timer and others, a counterlight correction button 25 for performing the exposure correction or the like at the counterlight, and other devices. These buttons 23, 24, 25 and others are designed to set up various modes when pressed, for example.

Still further, in the case of this camera, in addition to the ordinary mode for the common photography, the mode selection button 22 allows setting four kinds of modes (a portrait mode, a scenery mode, a stop action mode (a shutter priority mode), and a night view mode). For setting the respective modes, the aforesaid mode selection button 22 is made to slide in four given directions. In addition, a full-auto button 21 is provided in a central portion of the mode selection button 22, and this full-auto button 21 has a function to instantaneously return the photographing mode set through the mode selection button 22 or the like to the ordinary mode.

Moreover, under the aforesaid indication section 20 there are a date mode switching button 26a and a date setting button 26b. The date mode switching button 26a is for the purpose of switching the information on the date of the photography, for example, the date modes including "year/month/day", "month/day/year", "day/month/year", "day/hour/minute" and "no recording", whereas the date setting button 26b is for the purpose of setting year, month, day, hour, minute and others. Both buttons 26a, 26b are made to set the modes when pressed.

Besides, in both end portions of the rear surface side of this camera there are made opening portions 28, 29 for the connection of a strap or the like used when carrying this camera.

Figure 5:
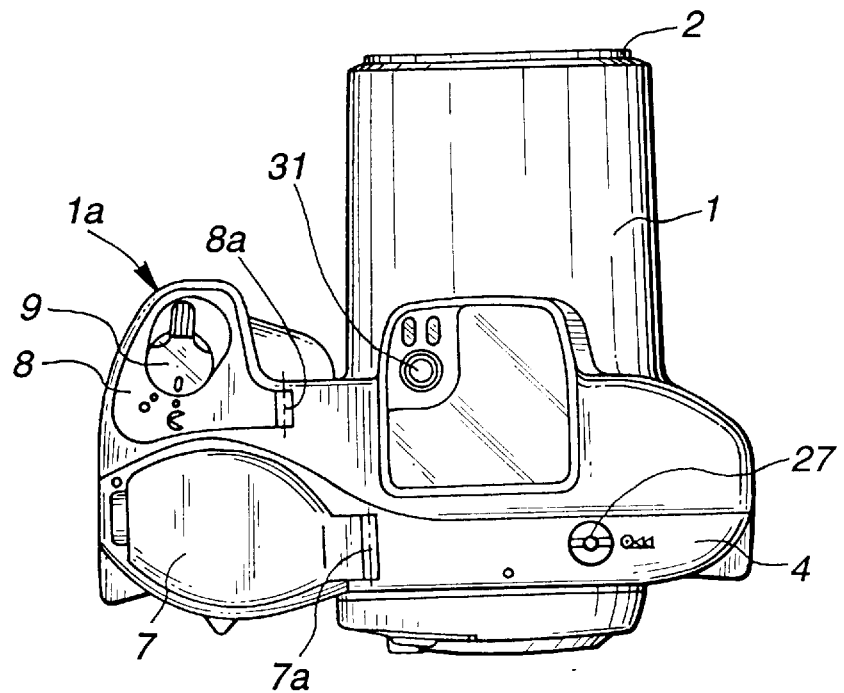
FIG. 5 is a bottom view showing the FIG. 1 camera.

Furthermore, as shown in FIG. 5, in the bottom surface portion in the rear cover 4 side of this camera, on one end side (the side where the gripping section 1a is provided) thereof there is placed a cartridge cover 7 for covering an opening section for insertion and detachment of a cartridge being a film mounting section for accommodating a roll film. This cartridge 7 is rotatably supported by a shaft member 7a in the bottom surface portion of the rear cover 4. In this case, the cartridge cover 7 is made to be rotatable about the shaft member 7a toward the outside of the camera within an angular range of approximately 100 degrees.

The cartridge cover 7 can release its locked state in a manner to slide a cartridge cover opening and closing lever 13 (see FIG. 4) placed at a side surface portion of the gripping section 1a. A locking button 14 is located in a central portion of the cartridge cover opening and closing lever 13, which prevents it from being opened in error due to a careless operation. More specifically, the cartridge cover opening and closing lever 13 is slidable only when the locking button 14 is pressed by a given quantity. Only in this case, the cartridge cover 7 comes into the open state. In addition, in the vicinity of the cartridge cover opening and closing lever 13, there is provided a lever cover 15 which is a cover for protecting the cartridge cover opening and closing lever 13.

In this camera, when the cartridge cover 7 is operated to the open state, the film loading is completed only in the manner that the cartridge cover 7 is rotated into the closed state after the cartridge accommodating the roll film is housed in the camera body, that is, it adopts the so-called drop-in loading method.

Furthermore, as shown in FIG. 5, in a bottom surface portion of the camera in the front cover 1 side and in the vicinity of the cartridge cover 7 and at a position corresponding to a bottom surface portion of the gripping section 1a, there is provided a battery cover 8 for covering an opening section which is made to insert and remove power supply batteries, for example, lithium batteries (two batteries), for the power supply to this camera. This battery cover 8 is rotatably supported by a shaft member 8a in a bottom surface portion of the front cover 1, whereupon the battery cover 8 is rotatable about the shaft member 8a toward the exterior of the camera within an angular range of approximately 100 degrees.

Still further, in the vicinity of the battery cover 8, there is provided an opening and closing lever 9 for opening and closing this battery cover 8, with the rotating operation of the opening and closing lever 9 releasing its locked state.

FIG. 5 shows a state that the opening and closing lever 9 is at a lock releasing position, and in this state the locked state of the battery cover 8 is releasable. In addition, the battery cover 8 is set to the locked state with respect to the front cover 1 in a manner that the opening and closing lever 9 undergoes the clockwise rotation from the FIG. 5 state.

Besides, placed at the other end portion of the bottom surface section of the camera is a halfway rewinding button 27 for rewinding the used film into the cartridge in the middle of photography or the like, and in a central front surface side of the bottom section there is provided a tripod mounting screw portion 31 and others for installing the camera on a tripod or the like.

Secondly, referring to FIGS. 7 and 8, a description will be made hereinbelow of a structure of an internal unit of the above-described camera.

Figure 7:
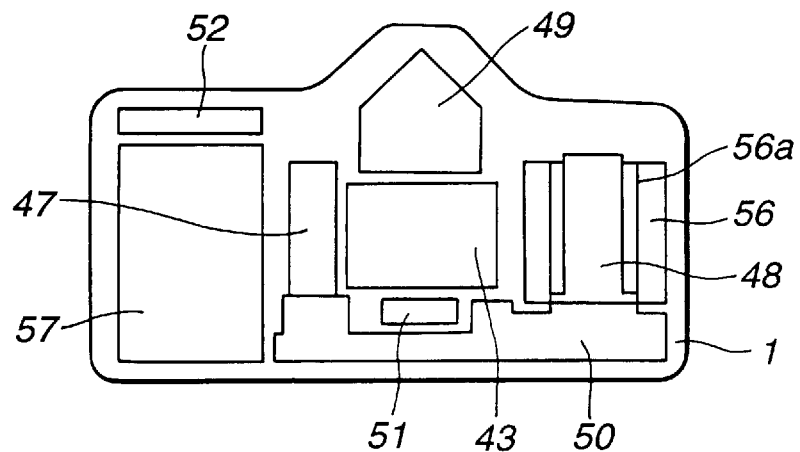
FIG. 7 is a schematic illustration of a disposition of an internal unit viewed from a front side of the FIG. 1 camera.
Figure 8:
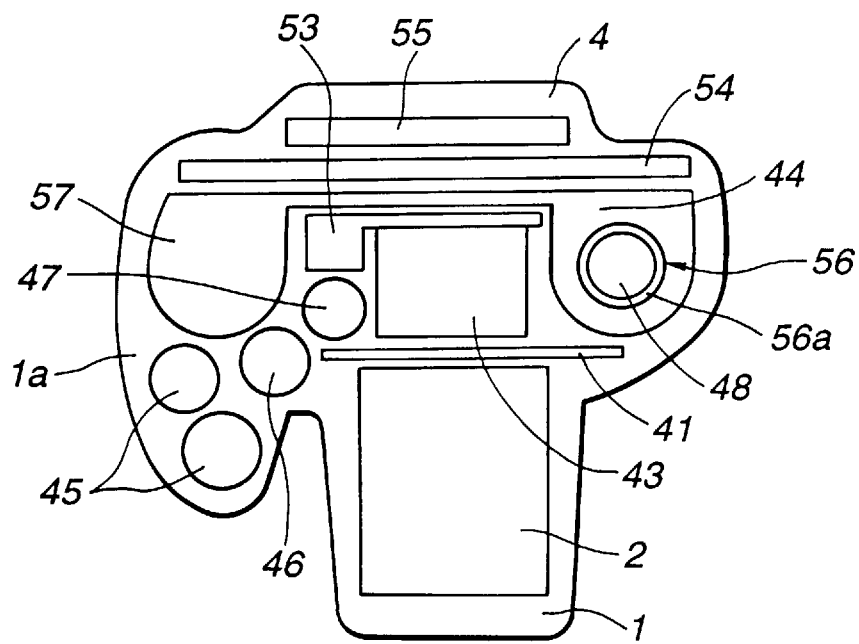
FIG. 8 is a schematic illustration of a disposition of an internal unit viewed from a top side of the FIG. 1 camera.

FIG. 7 is a schematic illustration of a disposition of the internal unit viewed from the front surface side of this camera and FIG. 8 is a schematic illustration of the internal unit viewed from the top surface side of this camera. However, FIGS. 7 and 8 do not illustrate the disposition of all the internal units in the interior of the camera but some portions are omitted for brevity, that is, for avoiding the complication of the drawings.

This camera is, as mentioned before, a lens integrated type single-lens reflex camera where the photographing and a camera body are in an integrated relation to each other, and as shown in FIG. 8 the photographing lens is held within the photographing lens barrel 2 placed in the cylindrical section made on the front surface side of the front cover 1.

As shown in FIGS. 7 and 8, in a substantially central portion of this camera there is disposed a mirror box 43 composed of a quick return mirror or the like adopted for a common single-lens reflex camera. Under it is an auto-focus (AF) sensor unit 51 for control of the distance measurement.

On the other hand, above the aforesaid mirror box 43 is a viewfinder unit 49 comprising, for example, a focusing screen, a roof mirror, or the like, whereupon a light beam incident on the photographing lens from a subject is led through the eye-piece lens system (not shown) to the aforesaid eye-piece section 16.

Disposed on the rear side of the mirror box 43 is a shutter unit 53 comprising a general focal plane shutter or the like, which takes charge of the exposure control. On the rear side of this shutter unit 53 is a first body 44 constituting the camera body, and in a substantially central portion of this first body 44 is an exposure opening section (not shown) whereby a light beam from a subject advances up to the film surface for the exposure. In addition, the first body 44 integrally has a cartridge compartment 57 defined in its one end portion (the side on which the gripping section 1a is disposed in FIG. 8) and a spool compartment 56 made at a substantial center of the other end portion which rotatably supports a spool shaft 56a serving as a first driven member and a film winding member. Further, a film traveling passage is formed in the vicinity of the exposure opening section between the cartridge compartment 57 and the spool compartment 56.

The cartridge compartment 57 of the first body 44 is disposed on the rear side of the gripping section 1a and at a position corresponding to the aforesaid cartridge cover 7 described with reference to FIG. 5.

Furthermore, a second body 54 is provided on the rear side of the first body 44. This second body 54 intercepts the light going from the cartridge compartment 57 to the spool compartment 56 and ensures a dimension within the film traveling passage in the vicinity of the exposure opening section through the use of a pressure plate section (not shown) or the like so that the necessary flatness of the film is achievable.

In this camera, the aforesaid pressure plate section (which will be described later) or the like is of the common type and is, for example, such that a projection portion is formed on a pressure plate surface according to a molding technique to attain the necessary dimension within the film traveling passage. The pressure plate is constructed integrally with the second body 54.

On the other hand, the aforesaid gripping section 1a accepts two power supply batteries 45, an electric flash capacitor 46 and others on the front side of the cartridge compartment 57.

Furthermore, as shown in FIG. 8, between the mirror box 43 and the photographing lens barrel 2 is a body plate 41 which is produced, for example, with a metallic plate such as a stainless steel plate having a thickness of approximately 1 mm to provide an extremely higher strength and a flatness accuracy in comparison with the other units. Further, the photographing lens barrel 2 and the mirror box 43 are directly fixed to the body plate 41, and all the internal units of this camera are also held by the body plate 41.

Still further, for the attachment to the armor members, the body plate 41 is fixedly secured through screws or the like to the front cover 1, whereupon the interior is held with the most excellent members and the first and second bodies 44, 54 and others are constructed so as not to directly come into contact with the armor members. With this construction, it is possible to provide a construction which is capable of preventing the respective cover members being the armor members from deforming, for example, due to the impact from the external and the external force and further which is susceptible of eliminating the strain or the like occurring in the interior of the camera to the utmost by a combination of the armor members.

On the other hand, a power source for this camera is roughly divided into four systems: a mirror shutter motor 47, a film loading motor 48, an AF motor (not shown) and an AV motor (not shown).

The mirror shutter motor 47 takes charge of the control of up and down movement of the aforesaid quick return mirror and further of the control of charging for the focal plane shutter, whereas the film loading motor 48 is in charge of the entire film loading operation and the variable power (zooming) operation of the photographing lens. Moreover, the AF motor (not shown) is disposed within the photographing lens barrel 2 to execute the focusing control, while the AV motor (not shown) conducts the control of the aperture.

Of these motors, the mirror shutter motor 47 and the film loading motor 48 are located in the body side and held on a motor base (which will be described in detail later) in FIG. 7 to organize a motor unit 50. This motor unit 50 is mounted from the bottom surface side of the camera and fixed through the mirror box 43, the first body 44 and others to be positioned at a given place within the camera.

As shown in FIGS. 7 and 8, the mirror shutter motor 47 is disposed without waste in a space surrounded by the shutter unit 53 (drive control section thereof), the electric flash capacitor 46, the mirror box 43 and others. The film loading motor 48 is located in the interior of the spool shaft 56a within the spool compartment 56.

Moreover, as shown in FIG. 7, a one-way clutch unit 52 (which will be described in detail later) is disposed above the gripping section 1a, and as shown in FIG. 8, a substrate 55 comprising circuits or the like for controlling the various operating members in the camera rear surface section is placed on the rearmost section side of this camera.

Subsequently, a detailed description will be made hereinbelow of an internal structure of the camera according to this embodiment.

Figure 9:
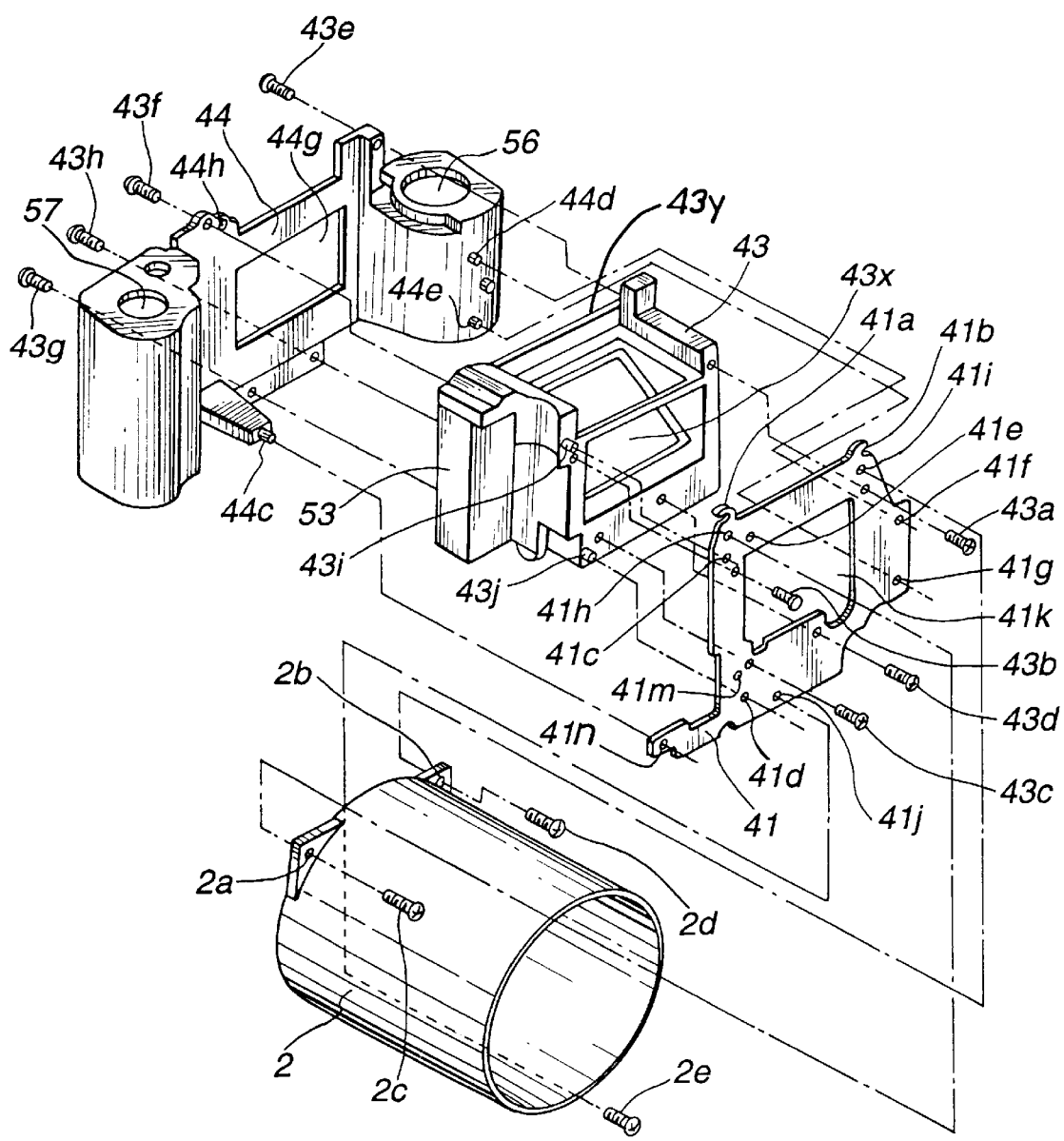
FIG. 9 is an exploded perspective view schematically showing a construction of a principal unit in the vicinity of a body plate in the interior of the FIG. 1 camera.
Figure 10:
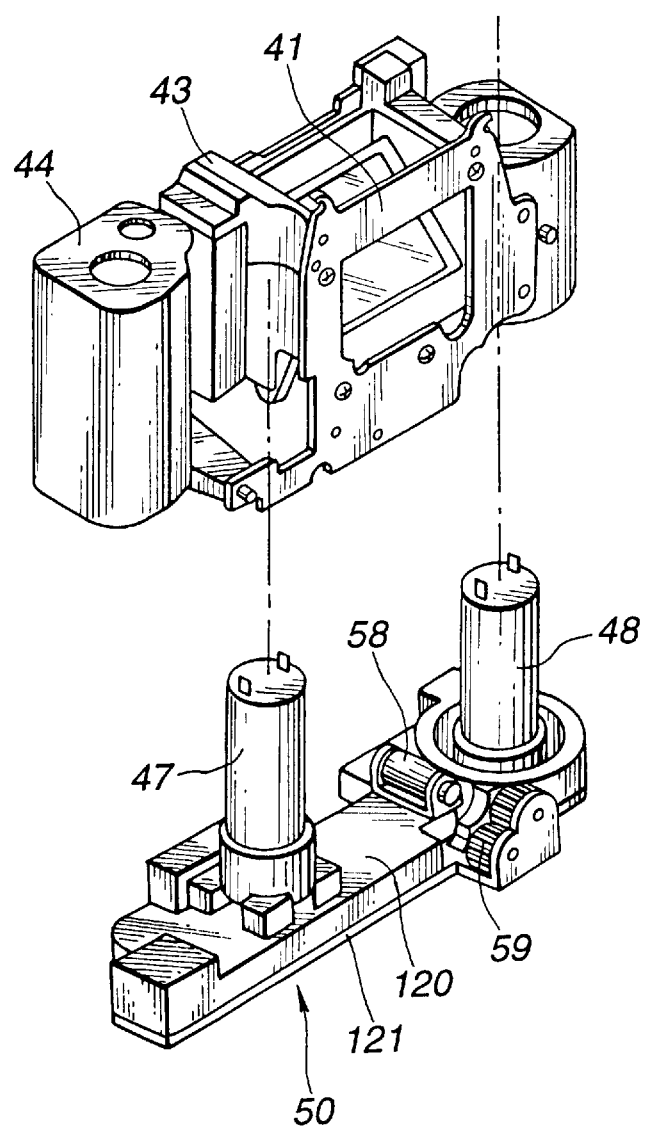
FIG. 10 is an exploded perspective view schematically showing a principal unit and motor unit of the FIG. 1 camera.

First of all, referring to FIGS. 9 and 10 a description will be taken of a principal unit near the body plate 41.

As shown in FIG. 9, made in a substantially central portion of the body plate 41 is an opening section 41k allowing the subject light beam from the photographing lens to pass, and formed around this opening section 41k is a section for the attachment of the respective units or the like, that is, the first body 44, the mirror box 43, the photographing lens barrel 2 and others.

The aforesaid body plate 41 is, as mentioned before, constructed with, for example, a metallic plate such as a stainless steel plate having a thickness of approximately 1 mm, and for a high-quality flatness, does not completely undergo the processing such as bending and restriction.

The mirror box 43 contains a general quick return mirror 43x therein, and the up and down control of this quick return mirror 43x comes under a drive system (not shown in FIG. 9) composed of the mirror shutter motor 47 and others.

As described above, the mirror box 43 is directly fixed to the body plate 41, and in this case positioning bosses 43i, 43j placed on the front surface side of the mirror box 43 engage with fitting holes 41c, 41d provided on the body plate 41 so that the mirror box 43 is positioned with respect to the body plate 41. Further, the body plate 41 and the mirror box 43 are directly fixed firmly at four places through self-tapping screws 43a, 43b, 43c and 43d. In this case, the positions of the self-tapping screws 43a, 43b, 43c and 43d exist in the circumferential portion of the box structural section on the mirror box 43 side and are portions where the box components continuously stand in the direction of the optical axis, and particularly portions having a sufficient strength in the direction of the optical axis.

On the other hand, on the rear surface side of the mirror box 43 there is located a common focal plane shutter 43y, with this focal plane shutter 43y being fixed through screws (not shown) or the like from the rear surface side of the mirror box 43 in a similar way.

In addition, on the further rear side of the mirror box 43 is the aforesaid first body 44 which has the exposure opening section 44g for determining the photographing scene size as described above. Provided at one end portion thereof is the foregoing cartridge compartment 57 for accommodating a cartridge mounted according to the drop-in method through the opening section covered with the cartridge cover 7 on the bottom surface side of the camera, while integrally formed on the other end portion thereof is the spool compartment 56 where the spool shaft (not shown in FIG. 9, designated at numeral 56a in FIGS. 7 and 8) is provided to wind the used roll film fed from the interior of the cartridge.

Between the mirror box 43 and the first body 44, two positioning bosses (not shown) provided toward the rear side of the mirror box 43 are engaged with two fitting holes (only one is illustrated in FIG. 9 and denoted at numeral 44h) provided on the first body 44 side as in the case of the fitting and fixation between the mirror box 43 and the body plate 41, so that the first body 44 is positioned relative to the body plate 41. Further, the first body 44 and the mirror box 43 are directly fixed firmly at four places through self-tapping screws 43e, 43f, 43g and 43h.

The above-mentioned units are formed to achieve the size reduction to utmost, and hence, for example in the case of the first body 44, it is considered that as the single unit the cartridge compartment 57 and the spool compartment 56 tend to deform with respect to the vicinity of the exposure opening section 44g. For this reason, for preventing such deformation, bosses are placed at three places of the first body 44.

More specifically, bosses 44d, 44e are provided on the front side of the spool compartment 56 and these bosses 44d, 44e are made to engage with fitting holes 41f, 41g, with the result that, even if an external force or the like, such as twisting, is slightly exerted on the spool compartment 56, it is correctly shifted to a given position to prevent the deformation.

In addition, on the front side of the cartridge compartment 57 there is provided a boss 44c which is fitted in a fitting hole 41n made on the body plate 41 side, thereby similarly preventing the deformation. In this instance, the boss 44c is made to have a length longer by approximately 2 mm than that of the bosses 44d, 44e, and when the boss 44c is fitted in the fitting hole 41n of the body plate 41, its tip portion protrudes toward the front surface side of the body plate 41.

Furthermore, in this state, i.e., in a state where the mirror box 43 and the first body 44 are fixedly secured to the body plate 41, the viewfinder unit 49 (not shown in FIG. 9, see FIG. 7) stands above the mirror box 43 while the motor unit 50 (not shown in FIG. 9, illustrated in detail in FIGS. 7 and 10) resides under the first body 44.

On the other hand, the aforesaid photographing lens barrel 2 is made to be fixedly attached from the front surface side of the body plate 41. That is, two positioning fitting holes 41*e*, 41*m* for the photographing lens barrel 2 are bored in the body plate 41, and these positioning fitting holes 41*e*, 41*m* are engaged with positioning bosses (not shown) located toward the rear side of the photographing lens barrel 2, so that the photographing lens barrel 2 is positioned with respect to the body plate 41.

In addition, on the rear end side of the photographing lens barrel 2 there are formed three flange portions (only two flange portions designated at numerals 2*a*, 2*b* are illustrated in FIG. 9) each of which has a through-hole. Further, screw tightening portions 41*h*, 41*i* and 41*j* are provided at positions of the body plate 41 side corresponding to these through-holes. These screw tightening portions 41*h*, 41*i* and 41*j* are tapped so that the photographing lens barrel 2 is firmly fixed through three screws 2*c*, 2*d*, 2*e* to the front surface side of the body plate 41.

Thus, the principal units including the photographing barrel 2, the mirror box 43 and the first body 44 are firmly held with respect to the body plate 41. Further, the principal units integrated are fixedly secured through only the body plate 41 with respect to the armor members (the respective cover members, not shown in FIG. 9) of the camera.

That is, fitting portions 41*a*, 41*b* and others provided above the body plate 41 are fitted to a fitting portion provided inside the armor members of the camera so that the body plate 41 is fixed to the armor members of the camera.

In FIG. 9, in terms of the fixing members between the body plate 41 and the armor members of the camera, only the fitting portions 41*a*, 41*b* are illustrated and detailed descriptions thereof are omitted.

Thus, the principal units integrated or the like are fixed to the armor members of the camera through only the body plate 41, and hence, even if, for example, an external force or the like is applied to the armor members of the camera, the external force or the like does not have influence on the principal units and others within the camera. In addition, the armor members are made to be as thin as possible for the purpose of the size and weight reduction of the camera itself.

FIG. 10 shows a state that the motor unit 50 is mounted on the principal units, i.e., the principal units including the mirror box 43 and the first body 44 integrated and held by the body plate 41. In FIG. 10, for avoiding the complication of the illustration, the photographing lens barrel 2, being a portion of the principal units, is omitted from the illustration.

As shown in FIG. 10, the motor unit 50 is mounted from below the principal units and positioned. The motor unit 50 is, as described before, composed of the mirror shutter motor 47, the film loading motor 48 and others.

That is, the housing of the motor unit 50 is formed by joining a first motor base 120 and a second motor base 121 through screws or the like, and at given places on the first motor base 120 of this housing there are disposed the mirror shutter motor 47 and the film loading motor 48 which take perpendicular positions relative to the motor base. A reduction drive system is provided within the housing of the motor unit 50 below the mirror shutter motor 47 and the film loading motor 48.

Furthermore, the film loading motor 48 also acts as the drive system for the variable power (zooming) operation of the photographing lens, and hence a clutch mechanism is provided in the gear train composing the reduction drive system, with the result that switching is possible between the drive system for the film loading operation and the drive system for the zooming operation of the photographing lens. The aforesaid clutch mechanism has two stopping positions at each of which the transfer of the rotational drive force of the film loading motor 48 in the forward and reverse directions is possible, and therefore a direct-advance solenoid plunger 58 for switching is used. This direct-advance solenoid plunger 58 is disposed on the top surface side of the first motor base 120 and the switching operation is made by driving a lever member (not shown).

Incidentally, although not shown in FIG. 10, within the motor unit 50, the rotary shafts of the mirror shutter motor 47 and the film loading motor 48 are substantially disposed in parallel, and drive forces of the respective motors 47, 48 are transferred through a pinion gear on the rotary shafts of the motors 47, 48 to the gear trains organizing the respective reduction drive systems (the details will be described later).

In the case of the gear train for the zooming operation, since there is a need to transfer the driving force of the film loading motor 48 to the interior of the photographing lens barrel 2, the rotating direction is changed through, for example, a bevel gear (not shown). Further, the driving force of the film loading motor 48 is transferred through a zoom system drive gear train 59 or the like to a gear train of a zoom drive system placed in the photographing lens barrel 2.

Figure 17:
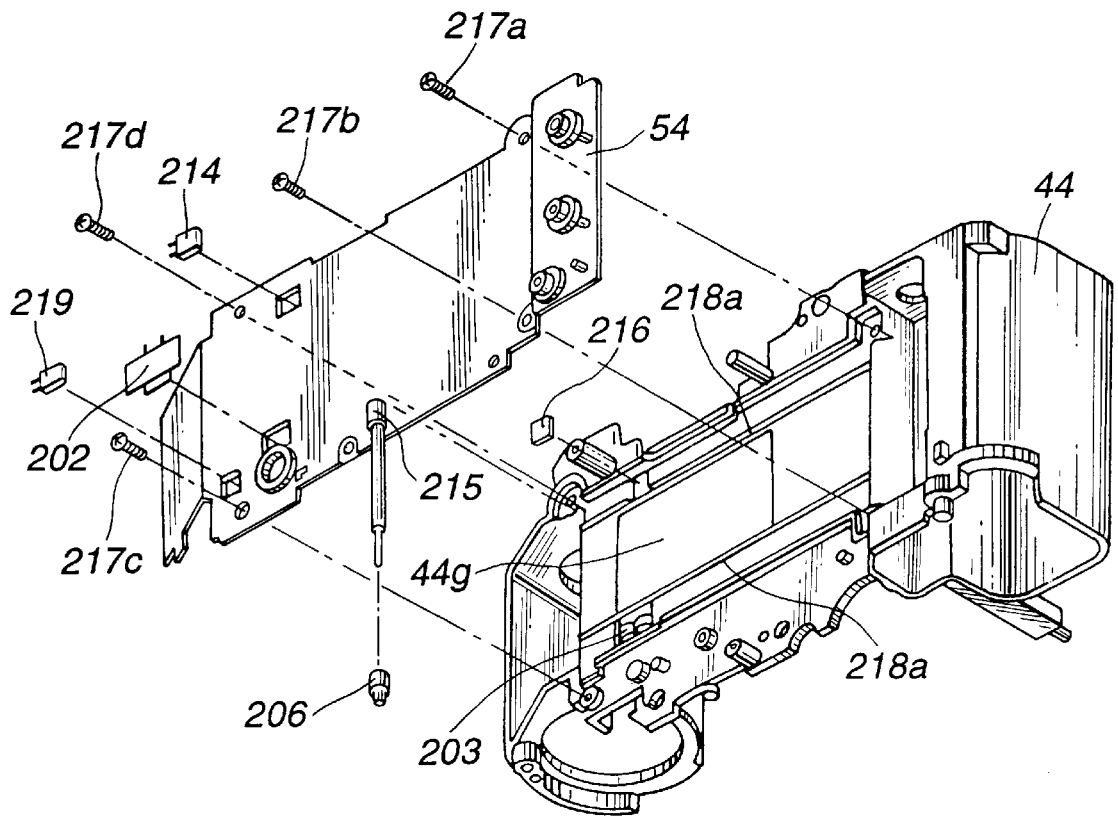
FIG. 17 is a schematic exploded perspective view showing a first body and a second body taken out from the FIG. 1 camera, viewed from a rear bottom surface side.
Figure 18:
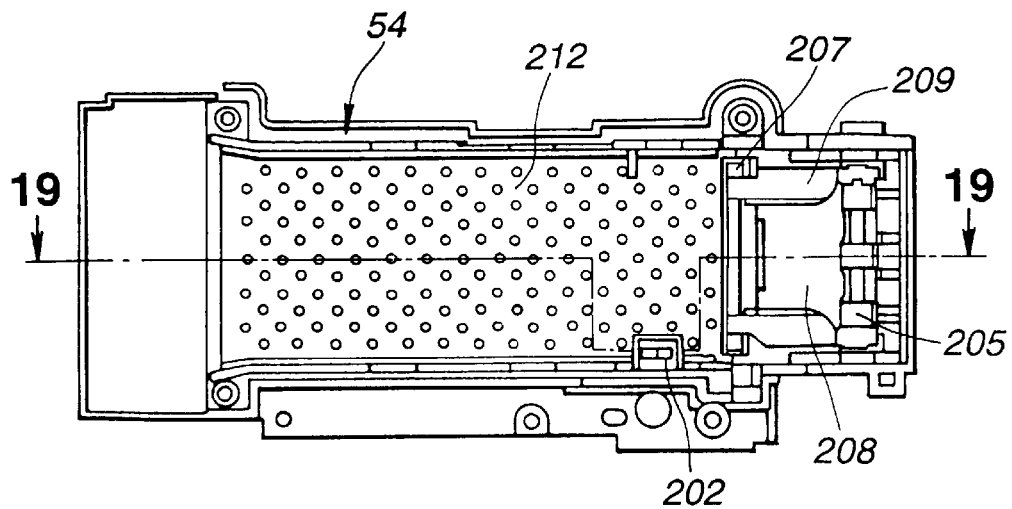
FIG. 18 is a front elevational view showing the second body of FIG. 1 camera viewed from a subject side.
Figure 19:
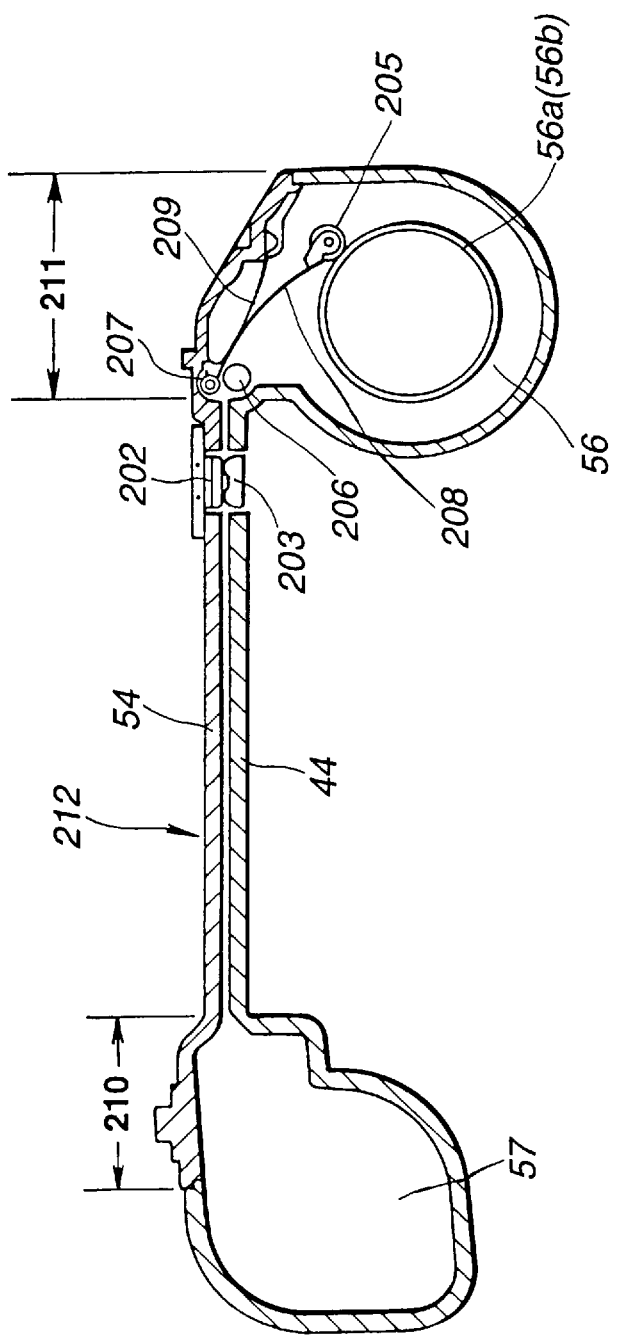
FIG. 19 is a longitudinal cross-sectional view of the first body and the second body taken along a line 19—19 of FIG. 18.

Referring to FIGS. 17 to 19 a description will be made hereinbelow of the structure in the vicinity of the first body 44 and the second body 54.

Although the motor unit 50 and others are made to be attached to the first body 44, in FIG. 17 the other structure such the motor unit 50 and others are omitted for avoiding the complication of the illustration.

Furthermore, FIG. 19 is for describing the structure in the vicinity of the second body 54, and the components such as the respective members in the spool compartment 56 are omitted in the illustration (the construction in the spool compartment 56 will be described in detail later with reference to FIG. 15).

In the actual assembling procedure, joining of the second body 54 is made after the joining of the first body 44, the motor unit 50, the viewfinder unit and others, and a description will be taken here of only the relationship between the first body 44 and the second body 54.

As shown in FIG. 17, a roller shaft 215 is interposed between the first body 44 and the second body 54, and a first body roller 206 is rotatably supported at one end portion of the roller shaft 215. A lower side tip portion of the first body roller 206 is constructed to have a high polygonal column-like reflection surface, and at the position facing the lower side tip portion of the first body roller 206, a film driven photoreflector (PR) 219 is installed on the second body 54 side.

Under the rear surface of the first body 44 there is provided a pressing pad 203 which is biased through a biasing member such as a spring (not shown) toward the rear side (the photographer side) of this camera. Thus, the pressing pad 203 is pressed toward the pressure plate section 212 side of the second body 54, that is, it presses one end portion of the film in the film traveling passage, for example, the portion including the magnetic information recording area or the like, with respect to a magnetic head 202 located on the rear side of this camera in a state that the film is interposed therebetween. Thus, during the film loading the pressing pad 203 makes the magnetic information recording area on the film surface come into contact with the magnetic head 202, thereby surely effecting the information recording operation.

Furthermore, located on the second body 54 are a perforation detection photoreflector (PR) 214 for detecting the film position, the film moving amount and others by sensing a perforation of the film, the magnetic head 202 for performing the information recording on the information recording area on the film surface, and other members.

Although in FIG. 17 the members such as the perforation detection PR 214, the magnetic head 202 and the film driven PR 219 are illustrated as element configurations for the convenience, in fact these members are fixed through soldering or the like onto, for example, a control substrate (not shown).

Still further, on the first body 44 side, a reflection plate 216 is disposed at the position corresponding to the perforation detection PR 214, and when the perforation of the film passes through above the reflection plate 216, the perforation detection PR 214 outputs a detection signal to effect the detection of the perforation, thereby detecting the film position, the film moving amount or the like.

Moreover, as described above, in FIG. 18, on a substantially central portion of the second body 54, the pressure plate 212 is placed integrally with the second body 54. This pressure plate 212 is made of, for example, a resin, and on its surface (film contact surface), spherical projection portions are regularly formed according to a molding technique or the like. These spherical projection portions are for securing the necessary dimension on the film surface, and a pressure plate heretofore put into practice is applicable.

Furthermore, as shown in FIG. 17 the first body 44 and the second body 54 are fitted and fixed at four places through self-tapping screws 217a, 217b, 217c and 217d. The positions of the four screwing places on the first body 44 side are determined to secure a sufficient strength and to restrict the position of the film in the optical axis direction with respect to the exposure opening section 44g and the vicinity thereof so that deformation or the like as little as possible occurs in a rail section 218a defining a film traveling passage.

On the other hand, as shown in FIG. 19, the second body 54 is roughly composed of three blocks integrally made: a cartridge compartment section 210 standing at the back of the cartridge compartment 57 being one end portion thereof, a spool compartment section 211 residing in the rear of the spool compartment 56 being the other end portion thereof, and the pressure plate 212 existing at a substantially central portion thereof.

In the spool compartment section 211 there are disposed a first guide plate 208 which rotatably holds a first guide roller 205 at its one end portion and a third guide plate 209 which holds a second body roller 207 at its one end portion. Each of the guide plate 208 and the third guide plate 209 is constructed with a thin leaf spring or the like, with the biasing force pressing the first guide roller 205 onto the outer circumferential surface of the spool shaft 56a and the second body roller 207 to the first body roller 206.

A brief description will be made hereinbelow of the operations of the respective components disposed in the vicinity of the first and second bodies 44, 54 thus constructed.

As described above, in this camera, the film placed in the film traveling passage is pressed by the pressing pad 203 against the magnetic head 202 and further, in the vicinity of the spool compartment 56, it is pressed by the second body roller 207 against the first body roller 206. Thus, when the film moves in the film traveling passage by the film loading operation, the first body roller 206 rotates accordingly.

In this case, in accordance with the rotation of the first body roller 206, the polygonal portion at a lower side tip portion thereof rotates, whereupon the film driven PR 219 detects the variation of the reflected light quantity, thereby detecting the film moving speed. Further, on the basis of the detected film moving speed the control circuit (not shown) or the like controls the magnetic head 202 to magnetically record information with a given density at a given position (for example, the magnetic information recording area) on the film surface.

The film moving quantity corresponding to one frame by the film loading operation is detected by the perforation detection PR 214 as described before. That is, with the film movement, the perforation of the film passes through above the perforation detection PR 214, and the reflection plate 216 disposed in opposed relation to the perforation detection PR 214 makes a high reflection light beam incident on the perforation detection PR 214. Further, the detection of a given number of perforations permits the detection of the film moving quantity corresponding to one frame. At this time, on the basis of a detection signal outputted from the perforation detection PR 214 the control circuit (not shown) or the like of this camera stops the film loading motor 48 to stop the film loading operation.

Subsequently, a description will be made hereinbelow of the drive system of the camera according to this embodiment. The description on the mirror shutter drive system, the zoom drive system and others will be omitted because they are not directly concerned with this invention, and the description will be taken of only the drive system for the film loading operation with reference to FIGS. 11 to 16.

Figure 11:
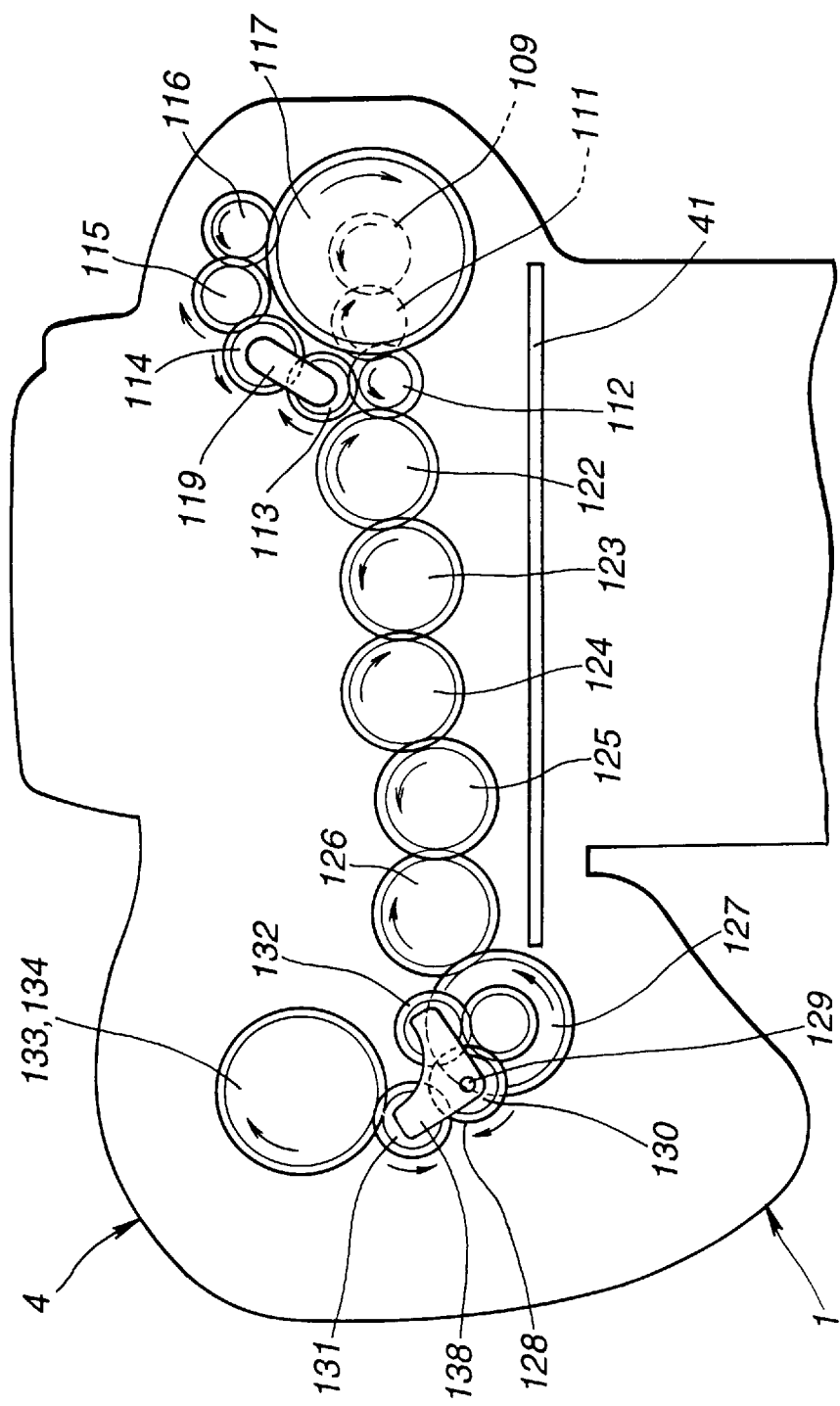
FIG. 11 is a schematic illustration of a disposition of a gear train of a film drive system viewed from a top side of the FIG. 1 camera, showing a film winding and initial loading state.

FIG. 11 shows a film winding (and an initial forwarding) state, in addition to the gear train of the drive system (which will be referred hereinafter to as a film drive system) for the film loading operation only the positional relationship among the outlines of the front cover 1, the rear cover 4 or the like being the armor members and the body plate 41 are illustrated, while the other internal components of the camera are omitted for avoiding the complication of the illustration.

Figure 12:
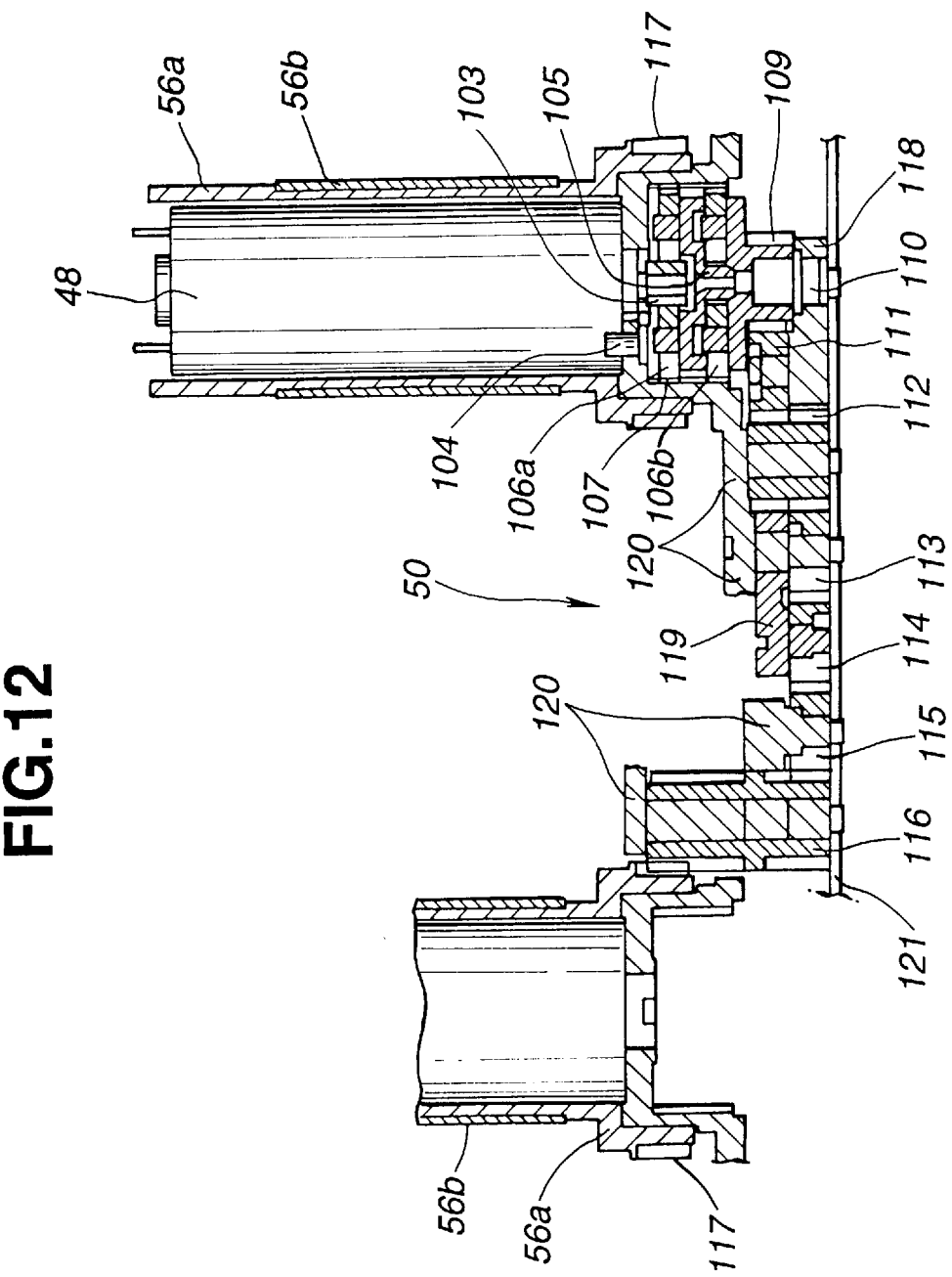
FIG. 12 is a development elevational view showing an engagement condition of a gear train of a film drive system of the FIG. 1 camera, particularly illustrating a gear train of a film winding drive system.

Furthermore, in FIG. 12, although the spool shaft 56a is shown at two places, this is because of the development of the gear train, and hence this illustration does not signify the presence of two spool shafts 56a.

First, an initial reduction section will be described with reference to FIGS. 11 and 12.

As shown in FIG. 12, the film loading motor 48 is fixed through two motor screws 104 to the first motor base 120 being an upper side structural base of the motor unit 50. A pinion gear 103 is integrally placed on the rotary shaft of the film loading motor 48.

The pinion gear 103 is engaged with three planetary gears 106a, and their positions are maintained by three trisection shafts protruding on a first reduction gear 105. The planetary gear 106a meshes, at its outer circumferential side, with an internal gear 107 integrally constructed with the first motor base 120. This internal gear 107 is stationary, and hence the planetary gear 106a revolves by the rotation of the film loading motor 48, so that the first reduction gear 105 rotates.

In addition, a second reduction gear 109 is placed coaxially with the pinion gear 103. The rotating center of this second reduction gear 109 is positioned through an arm shaft 110 fixed to a second motor base 121 being a lower structural base of the motor unit 50, and in addition to the aforesaid first reduction gear 105, three planetary gears 106b are also disposed relative to the second reduction gear 109, and engaged with the internal gear 107 and the first reduction gear 105. That is, the planetary gear 106b revolves by the rotation of the film loading motor 48, with the result that the second reduction gear 109 also rotates.

The pinion gear 103, the second reduction gears 106a, 106b, the first reduction gear 105, the second reduction gear 109, the internal gear 107 and others organize a differential mechanism.

With the above-mentioned two-stage differential mechanism, the second reduction gear 109 rotates at the following reduction ratio with respect to the pinion gear 103 directly fitted to the film loading motor 48 on the condition that the number of teeth of the pinion gear 103 =12, the number of teeth of the first reduction gear 105 =12 and the number of teeth of the internal gear 107=66.

$$((12+66)/12)^2=6.5\ ^2$$

where ^ signifies the power.

In this instance, in the case that the final output gear rotates by "1/a" in response to the rotation of the motor by "1", the denominator "a" is referred to as the reduction ratio.

Furthermore, as shown in FIG. 11, the second reduction gear 109 is provided at one end portion on the side opposite to the gripping section (1a) side of this camera, i.e., at the end portion on the side where the spool compartment (56) exists. That is, as shown in FIG. 12, the second reduction gear 109 is provided coaxially with the film loading motor 48, and since as described before the film loading motor 48 is set within the spool shaft 56a, the second reduction gear 109 is also disposed coaxially with a spool gear 117 integrally set to the spool shaft 56a.

As shown in FIG. 11, the output of the second reduction gear 109 is transferred to a first W gear 111 and a second W gear 112 and is branched through the second W gear 112 into two directions of a third W gear 113 on the winding drive system side and a first RW gear 122 on the rewinding drive system side.

In this case, the winding drive system is composed of a gear train for rotating the spool shaft 56a to wind the film within the cartridge on the spool shaft 56a side, whereas the rewinding drive system is made up of a gear train constituting an initial forwarding mechanism for rewinding the film within the cartridge and further for rotating a cartridge shaft, which is a second driven member and a film rewinding member, in a direction of forwarding the film to the exterior of the cartridge. This film initial forwarding mechanism is a mechanism inherent in a camera or the like which adopts a film cartridge in The Advanced Photo System.

The first W gear 111 is supported by a W gear arm 118 as shown in FIG. 12. This W gear arm 118 is the so-called planetary arm, and a frictional engagement is provided given through a wave washer (not shown) or the like with the first W gear 111. This is for releasing the engagement between the first W gear 111 and the second W gear 112 by the revolution of the W gear arm 118. In this camera according to this embodiment, in the case that the driving force of the film loading motor 48 is transferred to the zoom drive system (not shown) side, the W gear arm 118 revolves. However, the description thereof will be omitted for brevity.

Furthermore, the first W gear 111 is held at the position as shown in FIG. 11 in the middle of loading the film irrespective of the rotating direction of the film loading motor 48, and the first W gear 111 and the second W gear 112 are always in the engaged relation to each other.

On the other hand, the gear train constituting the winding drive system, i.e., the second W gear 112, a third W gear 113, a fourth W gear 114, a fifth W gear 115 and a sixth W gear 116, is disposed in the vicinity of the spool compartment (56) to surround it, and the sixth W gear 116 is in an engaging relationship with to the spool gear 117. In this instance, in the case of winding the film, the second reduction gear 109 is rotated counterclockwise in FIG. 11 to rotate the spool gear 117 clockwise, so that the spool shaft 56a is rotated in the direction of winding the film.

The third W gear 113 and the fourth W gear 114 (a first planetary gear) are rotatably supported at opposite end portions of the first clutch arm 119, respectively, and are in an engaging relation to each other, and a frictional engagement is providing given through a wave washer (not shown) or the like thereto, thus composing a first planetary clutch mechanism.

On the other hand, in the gear train organizing the rewinding drive system (and the forwarding drive system), the second W gear 112 is always in engaging relation to the first RW gear 122, and hence the idle gear train from the first RW gear 122 through a second RW gear 123, a third RW gear 124 and a fourth RW gear 125 to a fifth RW gear 126 are always in rotating condition regardless of the rotating direction of the film loading motor 48.

The fifth RW gear 126 is engaged with a large gear portion of a sixth RW gear 127, whereas a small gear portion of the sixth RW gear 127 is meshed with a seventh RW gear 128. The gears from the second W gear 112 to the sixth RW gear 127 constituting a gear train are located within the motor unit 50.

The seventh RW gear 128 and an eighth RW gear 130 are set at opposite end portions of an RW shaft 129 being a shaft member, respectively. Whereupon, the driving force from the gear train within the motor unit 50 is transferred to the upper portion side of the cartridge compartment 57 (see FIGS. 13 and 14). In this case, one end portion of the RW shaft 129 on the side where the seventh RW gear 128 resides is rotatably supported by the first body 44.

Moreover, of the gear train constituting the rewinding drive system (and the forwarding drive system), the respective gears from the first RW gear 122 to the sixth RW gear 127 are, as mentioned before, disposed within the motor unit 50. In this case, the respective gears are positioned by shaft portions protruding from the first motor base 120, and the restriction thereof in the thrust directions is made by the second motor base 121.

The eighth RW gear 130 serves as a sun gear for second planetary gears, i.e., two gears (a ninth RW gear 131 and a tenth RW gear 132) held on two arm portions of a second clutch arm 138 having an L-like configuration.

More specifically, the ninth and tenth RW gears 131, 132, which are the second planetary gears, are rotatably supported by shaft portions integrally constructed with the respective arm portions of the second clutch arm 138, and a frictional engagement is provided thereto by means of a wave washer (not shown) or the like. Accordingly, the second clutch arm 138 is made to revolve in accordance with the rotating direction of the eighth RW gear 130, thus organizing a second planetary clutch mechanism.

In the state as shown in FIG. 11, the second clutch arm 138 is subjected to the clockwise rotation of the eighth RW gear 130 to rotate in the same direction, and the ninth RW gear 131 rotatably supported at the one arm portion of the second clutch arm 138 is in engaging relation with an eleventh RW gear 133. This state corresponds to the development placed on the left-hand side with respect to the eighth RW gear 130 in FIG. 13.

Figure 13:
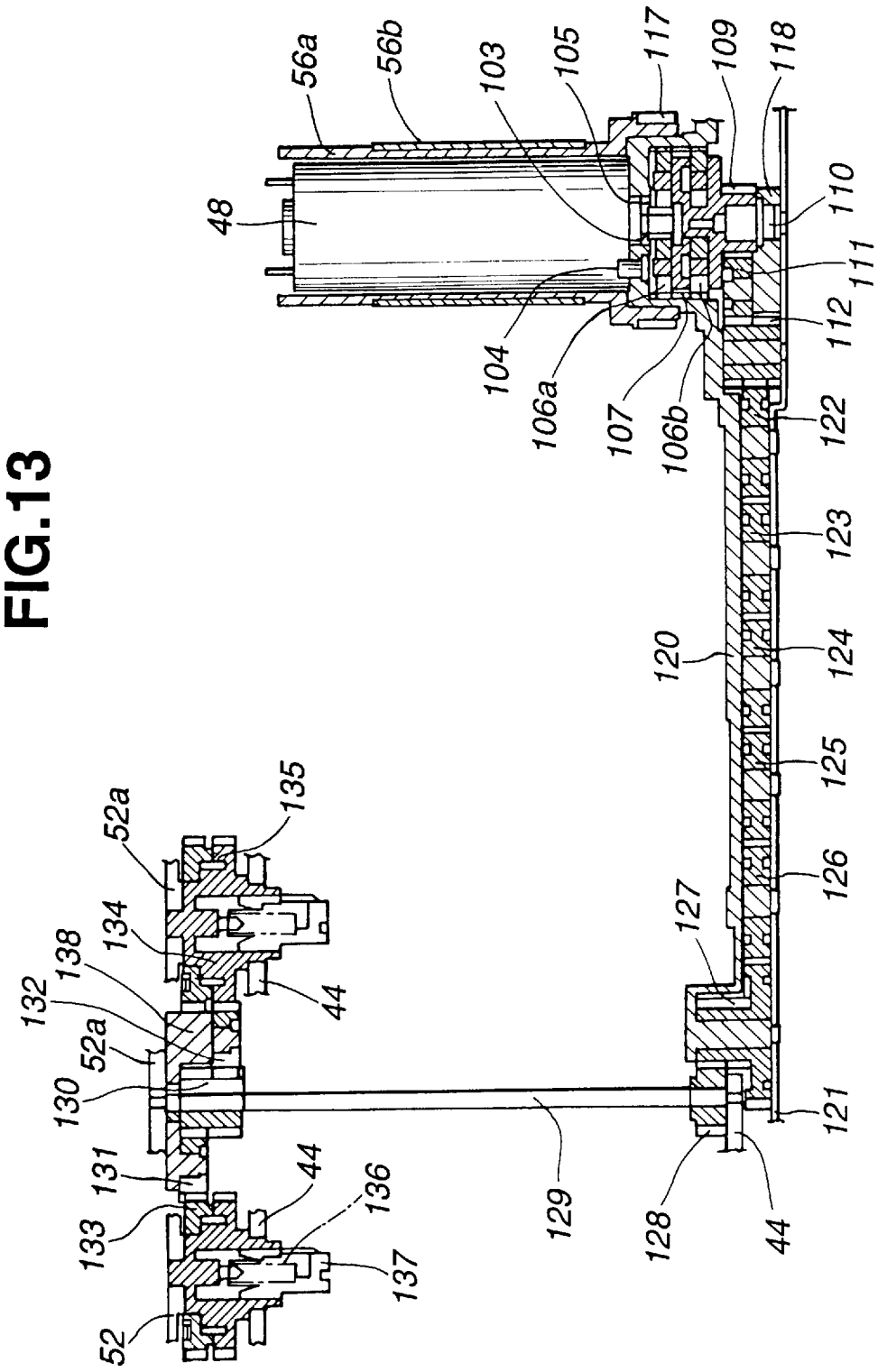
FIG. 13 is a development elevational view showing an engagement condition of a gear train of a film drive system of the FIG. 1 camera, particularly illustrating a gear train of a film rewinding drive system.

Furthermore, in FIG. 13, the development located on the right-hand side with respect to the eighth RW gear 130 shows the state that the tenth RW gear 132 rotatably supported by the other arm portion of the second clutch arm 138 is engaged with a twelfth RW gear 134. This state signifies that the second clutch arm 138 experiences the counterclockwise rotation of the eighth RW gear 130 in FIG. 11 to revolve in the same direction. Accordingly, the engagement state (the left-hand side development in FIG. 13) between the ninth RW gear 131 and the eleventh RW gear 133 and the engagement state (the right-hand side development in FIG. 13) between the tenth RW gear 132 and the twelfth RW gear 134 do not concurrently occur.

Figure 14:
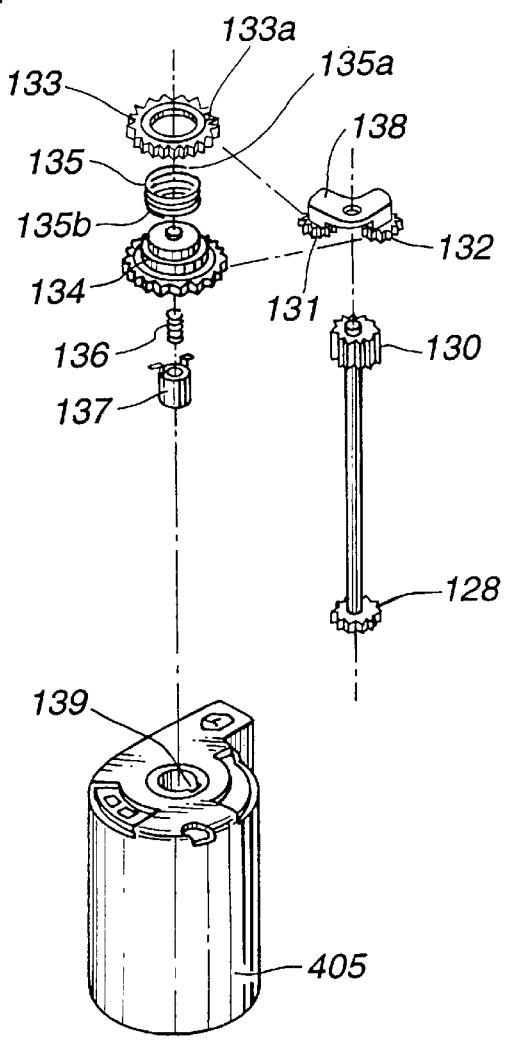
FIG. 14 is an exploded perspective view showing a one-way clutch unit of the FIG. 1 camera and a perspective view schematically showing a cartridge engaging with the unit.

The eleventh and twelfth RW gears 133, 134 compose a one-way clutch mechanism (the above-mentioned one-way clutch unit 52) which in turn, is disposed so that its axis coincides with the axis (the cartridge axis) of a cartridge 405 to be mounted in the cartridge compartment 57 (see FIG. 14).

Referring to FIG. 14, a description will be made of the one-way clutch mechanism. The twelfth RW gear 134 holds an RW claw 137 with a spring biasing force by means of an RW spring 136, while the RW claw 137 is slidable in the axial direction. In this case, the RW claw 137 rotates together with rotation of the twelfth RW gear 134 in the same direction. Further, the RW claw 137 is engaged with an engaging portion 139 provided one end portion of the cartridge shaft within the cartridge 405 mounted in the camera, whereupon the driving force from the film loading motor 48 is transferred to the cartridge shaft of the cartridge 405.

More specifically, as shown in FIG. 14, the RW spring 136 has, for example, a coil-like configuration and opposite end portions thereof are engaged with a projection portion (not shown) formed on the lower surface side of the twelfth RW gear 134 and a recess portion made on the top surface side of the RW claw 137, whereupon it is positioned. Further, the RW claw 137 is built in the twelfth RW gear 134 in a snap-in way.

A portion comprising a cylindrical configuration is provided on a top surface portion of the twelfth RW gear 134 and a one-way spring 135 is disposed at its circumferential portion. This one-way spring 135 has, for example, a coil-like configuration and constitutes the so-called spring clutch arranged to be locked with the twelfth RW gear 134 by winding and tightening. That is, on the eleventh RW gear 133 on the upper side thereof there is provided an engagement portion 133a whereby the eleventh RW gear 133 and the one-way spring 135 come into engagement with each other. With the rotation of the eleventh RW gear 133 in the forward and reverse directions, the one-way spring 135 is tightened and loosened.

More specifically, the one-way spring 135 is equipped with a hook portion 135a and an end portion 135b, and the hook portion 135a is engaged with the engagement portion 133a of the eleventh RW gear 133. In this state, when the eleventh RW gear 133 rotates clockwise, since the engagement portion 133a and the hook portion 135a are in engaging relation with each other, the one-way spring 135 is biased in the tightened direction. Further, the end portion 135b rotates the twelfth RW gear 134 in the same direction in accordance with the rotation of the eleventh RW gear 133 without slipping with respect to the twelfth RW gear 134.

Furthermore, when the eleventh RW gear 133 rotates counterclockwise in FIG. 14, the hook portion 135a works in the direction of loosening the one-way spring 135. Accordingly, the end portion 135b slips without locking with respect to the twelfth RW gear 134, so that the twelfth RW gear 134 does not rotate.

Although the one-way clutch mechanism is thus constructed, since whether the ninth and tenth RW gears 131, 132 engage with the eleventh or twelfth RW gear 133 or 134 depends upon the rotating direction of the eighth RW gear 130, in the state where the cartridge 405 is mounted in the camera but the film is not fed, the slippage of the one-way spring 135 of the one-way clutch mechanism does not occur. That is, this one-way clutch mechanism is necessary only when in the camera containing the cartridge 405 the film winding operation is made from the initial forwarding operation.

In the one-way clutch mechanism, the thrust-direction restriction relies upon the first body 44 and a one-way clutch base 52a. That is, as described above with reference to FIG. 7 the one-way clutch unit 52 is disposed above the gripping section 1a of this camera and is positioned at a given place by the first body 44 and the one-way clutch base 52a. Whereupon, the restriction of the second clutch arm 138 and the eighth RW gear 130 in the thrust direction is also possible.

FIG. 11 shows the operation of the auto-loading mechanism in the camera according to this embodiment, i.e., the state of carrying out the initial forwarding operation and the winding operation of the film. That is, in a manner that the spool gear 117 rotates clockwise in FIG. 11, the eleventh RW gear 133 is rotated clockwise in FIG. 11 through the gear trains of the rewinding drive system (and the forwarding drive system), and therefore the RW claw 137 rotates the cartridge shaft in the direction of forwarding the film to perform the film initial forwarding operation, that is, to lead out the film into the film traveling passage and further to the spool shaft (56a) within the spool compartment (56). Further, meanwhile the spool shaft 56a, together with the spool gear 117, continues to rotate clockwise in FIG. 11 and the film initial forwarding operation shifts to the film winding operation from the time that the tip portion of the film forwarded from the interior of the cartridge comes into contact with the spool shaft (56a).

Figure 15:
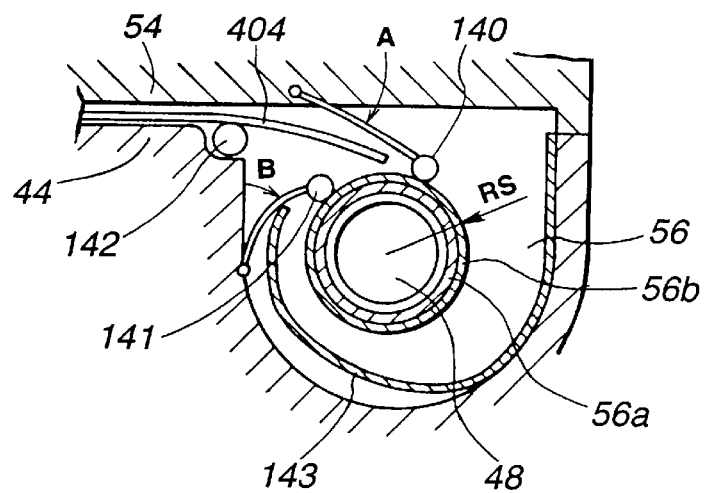
FIG. 15 is a transverse cross-sectional view showing the FIG. 1 camera in the vicinity of spool compartment.

Referring to FIG. 15, a brief description will be made here of a film winding mechanism located in the vicinity of the spool shaft. Incidentally, the film winding mechanism in this camera is a prior common one for a camera or the like using, for example, the 135 type film cartridge, that is, involves a friction winding mechanism based upon a frictional force or the like.

As shown in FIG. 15, the film loading motor 48 is situated inside the spool shaft 56a provided at one end portion of the first body 44 and rotatably supported at the central portion of the spool compartment 56. In this case, a slight gap is made between the outer circumferential portion of the film loading motor 48 and the inner wall surface of the spool shaft 56a.

A spool rubber 56b constructed employing a thin silicon rubber or the like is placed in the outer circumferential portion of the spool shaft 56a by pressure insertion or the like. Two roller members are brought into contact with the spool rubber 56b by a spring force. That is, a first guide roller 140 being one roller member is biased in a direction indicated by an arrow A in FIG. 15 by means of a biasing member such as a leaf spring having a supported portion at a fixing member (not shown) on the second body 54 side.

Thus, a film 404 forwarded from the cartridge 405 is brought into contact with the outer circumferential surface of the spool shaft 56a and pressed.

Furthermore, a second guide roller 141 being the other roller member is biased in a direction indicated by an arrow B in FIG. 15 through the use of a biasing member such as a leaf spring having a supported portion at a fixing member (not shown) on the first body 44 side. Accordingly, (due to roller 141) the film 404 comes into contact with the outer circumferential surface of the spool shaft 56a at a portion corresponding to substantially one revolution of the tip portion of the film 404 forwarded from the interior of the cartridge 405 around the outer circumferential surface of the spool shaft 56a, and roller 141 presses the film against rubber cover 56b.

On the inner wall surface of the spool compartment 56 there is disposed a guide sheet 143 whereby the tip portion of the film 404 forwarded from within the cartridge 405 into the spool compartment 56 is led onto the outer circumferential surface of the spool shaft 56a. This guide sheet 143 is, at its support point, fixed to a first body 44 side fixing member (not shown) and is disposed along the inner wall surface of the spool compartment 56 and further along the outer circumferential surface of the spool shaft 56a.

In the film winding mechanism thus constructed in the vicinity of the spool shaft, when the film 404 passes through between the first guide roller 140 and the spool shaft 56a, a frictional force due to the spool rubber 56b causes the film 404 to wind itself around the spool shaft 56a.

Furthermore, since this camera according to this embodiment conforms to The Advanced Photo System as described before, it conducts the film initial forwarding operation which is the operation performed until the film 404 reaches the first guide roller 140. That is, until coming to the state as shown in FIG. 15, the rotation of the eleventh RW gear 133 causes the rotation of the cartridge shaft of the cartridge 405 mounted in the cartridge compartment 57, thus accomplishing the film initial forwarding operation.

Made between the first body 44 and the second body 54 is a separation which is useful for ensuring the optimal flatness of the film 404 in the exposure opening section. At an end portion thereof, i.e., between the film travelling passage and the spool compartment 56, a body roller 142 is rotatably provided on a fixing member (not shown) on the first body 44 side. This body roller 142 reduces the loss due to the friction or the like occurring when the film 404 is delivered into the spool compartment 56, and a detection section (not shown) provided in connection with the body roller 142 detects the rotational speed of the body roller 142, with the detection result being feedbacked to a control circuit or the like which controls the timings for the magnetic information recording or the like.

Thus, as shown in FIG. 11 the clockwise rotation of the eleventh RW gear 133 develops the rotation of the RW claw 137 in FIG. 14 to rotate the cartridge shaft within the cartridge 405 in the film initial forwarding direction, thus conducting the film initial forwarding operation.

In this camera according to this embodiment, the total reduction ratio iAL of the forwarding drive systems (the reduction ratio of the film forwarding gear train) is set to be iAL=263.1. In addition, the film loading motor 48 is constructed using a DC cored motor of $\phi 12$ (mm) and L=30 (mm), which is capable of providing a torque necessary and sufficient for the driving of the cartridge shaft through the reduction drive system.

Furthermore, the total reduction ratio iW of the winding drive system as shown in FIG. 11 (the reduction ratio of the film winding gear train) is set to iW=135.2. In addition, as shown in FIG. 15, within the spool compartment 56, the radius Rs of the outer circumferential portion of the spool rubber 56b is set to be Rs=7.6 mm.

Since, as described above the total reduction ratio iAL of the forwarding drive system is set to be sufficiently large as compared with the total reduction ratio iW of the winding drive system, when the film 404 forwarded from the interior of the cartridge 405 is wound around the spool rubber 56b on the spool shaft 56a, the film 404 is taken up by the spool shaft 56a at a speed higher than the shifting speed due to the forwarding drive system. Accordingly, the film 404 is wound around the spool rubber 56b on the spool shaft 56a to be adhered closely thereto, but not wound to inflate.

In the state shown in FIG. 11, when the film (404) is wound around the spool shaft (56a) and comes into the winding state at a higher speed than that by the forwarding drive system, the one-way clutch mechanism composed of the eleventh and twelfth RW gears 133, 134 and others is put into operation. That is, the winding of the film 404 at the speed higher than that in the forwarding drive system signifies that in FIG. 14 the engagement section 139 rotates faster than the eleventh RW gear 133, and the relative relationship between the eleventh and twelfth RW gears 133, 134 is similar to that the eleventh RW gear 133 rotates counterclockwise in FIG. 11 as described above. In this state, the one-way spring 135 works in the loosening direction, and therefore the eleventh and twelfth RW gears 133, 134 are released from the locking condition.

Thus, after the film 404 is wound around the spool shaft 56a, the state of the above-mentioned gear train proceeds to the state shown in FIG. 11, and the eleventh RW gear 133 does not take part in the film forwarding operation and the winding operation occurs in an idle running condition.

Furthermore, referring to FIG. 16 a description will be made hereinbelow of the rewinding drive system of this camera when conducting the film rewinding operation.

Figure 16:
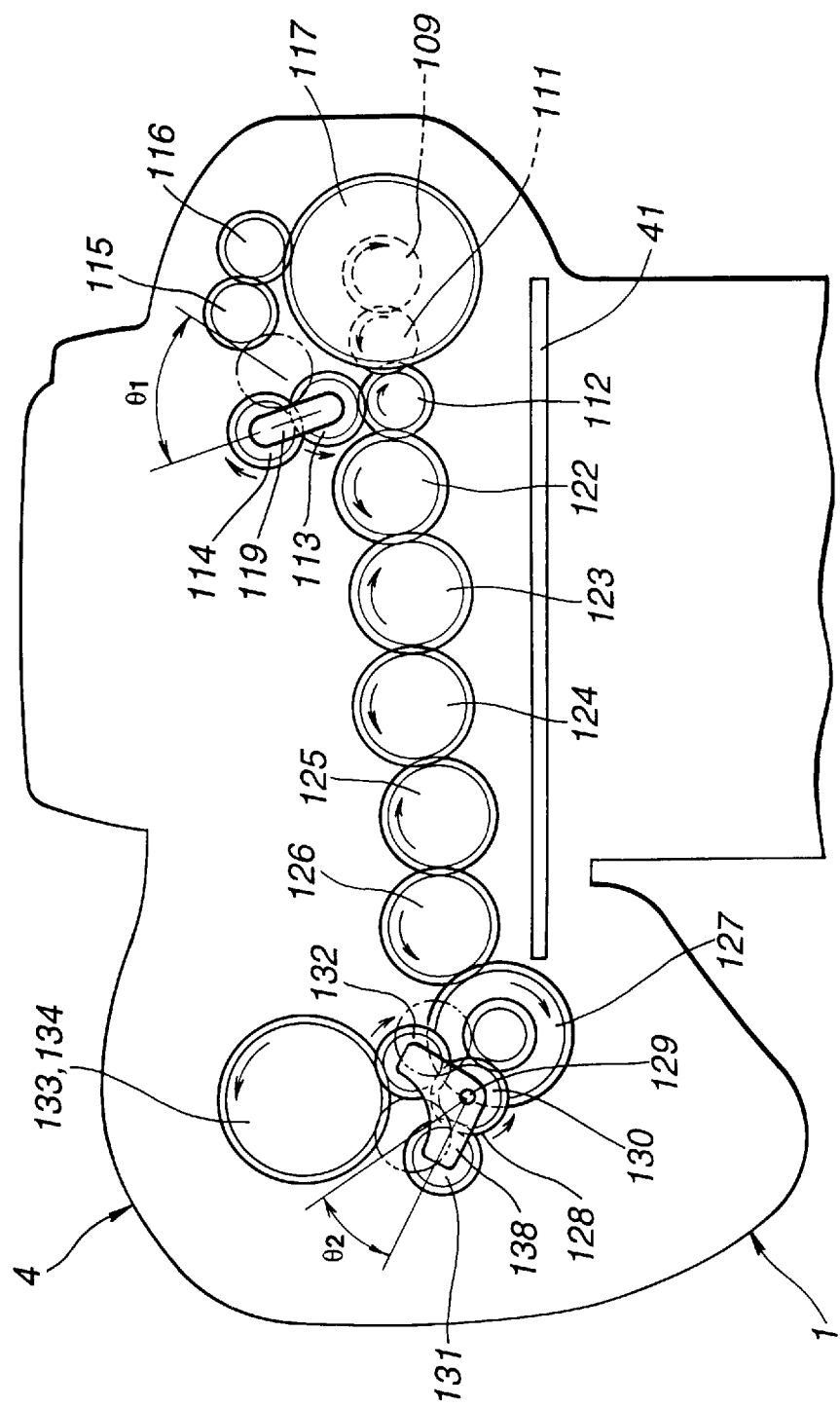
FIG. 16 is a schematic structural illustration of a disposition of a gear train of a film drive system viewed from the top side of the FIG. 1 camera, showing a film rewinding state.

As shown in FIG. 16, at the film rewinding operation the position of the first W gear 111 is the same as that at the winding operation while the rotating direction of the film loading motor 48, i.e., the rotating direction of the second reduction gear 109, differs therefrom. More specifically, when the second reduction gear 109 rotates clockwise in FIG. 16, the respective gears organizing the above-mentioned rewinding drive system rotate in the directions indicated by arrows in FIG. 16.

As described above, the fourth W gear 114 is rotatably supported at one arm portion of the first clutch arm 119 and a friction is given through the wave washer (not shown) or the like. In addition, the third W gear 113 is rotatably supported at the other arm portion of the first clutch arm 119 and the third W gear 113 and the first clutch arm 119 coaxially and rotatably supported and positioned within the first motor base 120.

In the case of the film winding operation, when the film loading motor 48 (the aforesaid second reduction gear 109) rotates counterclockwise (referred to as rotation in a second direction) in FIG. 11, the first clutch arm 119 is fixed at a given position through a stopper member (not shown) or the like in the state as shown in FIG. 11, and at this position the fourth W gear 114 and the fifth W gear 115 are maintained in the engaging condition.

On the other hand, in the case of the film rewinding operation, when in FIG. 16 the film loading motor 48 (the second reduction gear 109) rotates clockwise (referred to as rotation in a first direction), the first clutch arm 119 revolves by an angle $\theta 1$ counterclockwise in FIG. 16 about its support shaft and is fixed at this position, i.e., at a given position by a stopper member (not shown). At this position, the fourth W gear 114 and the fifth W gear 115 are released from an engaging condition.

Accordingly, of the gears constituting the gear train of the winding drive system, the respective gears from the fifth W gear 115 to the spool gear 117 move to a non-operated condition.

Still further, in the case of the film rewinding operation, the rotating direction of the eighth RW gear 130 of the rewinding drive system is the opposite to the rotating direction at the winding. That is, when the film loading motor 48 (the second reduction gear 109) rotates clockwise (the rotation in the first direction) in FIG. 16, the eighth RW gear 130 rotates counterclockwise in FIG. 16, and accordingly the second clutch arm 138 also revolves counterclockwise in FIG. 16. In addition, when rotating by an angle θ2, the second clutch arm 138 is positioned at that position by a stopper member (not shown) and further the tenth RW gear 132 comes into engagement with the twelfth RW gear 134. Whereupon the driving force of the film loading motor 48 is transferred to the rewinding drive system and the transfer of the driving force is released within the forwarding drive system.

Incidentally, the state at this time is the state developed on the right-hand side with respect to the eighth RW gear 130 in FIG. 13. In this case, since the tenth RW gear 132 is in engagement with the twelfth RW gear 134, the driving force of the eighth RW gear 130 is directly transferred to the twelfth RW gear 134 without the use of the one-way clutch mechanism.

Furthermore, the contents of the eleventh and twelfth gears 133, 134 are the same in the forwarding drive system and in the rewinding drive system, and hence the total reduction ratio iRW of the rewinding drive system is set to iRW=263.1 which is the same as that of the total reduction ratio iAL of the forwarding drive system.

As described above, in the camera according to the above-described embodiment, the film initial forwarding operation, the winding operation and the rewinding operation are possible in the manner that the rotation of a single motor, i.e., the film loading motor 48, is made in the forward and reverse directions.

Considering the relationship between the initial forwarding operation and the winding operation in the film loading operation, in the case of the speed of the initial forwarding operation being higher than that of the film winding operation, the film loosens within the spool compartment 56, and hence difficulty is experienced to tightly wind the film around spool shaft 56a (which will be referred hereinafter to as tight winding). Incidentally, in this case, the wound film diameter actually increases as the film is wound around the spool shaft 56a, and therefore the difference in speed therebetween becomes wider even during the film winding operation.

Moreover, it is considered that the elastic force or the like the film has greatly varies in characteristic depending upon the kind of film and the operational environment of the film, which can affect the film winding operation.

On the other hand, although the film winding operation itself is possible in the case that the film forwarding side speed is set to be extremely low, the time taken for the initial forwarding operation, i.e., the time taken until the film tip portion passes through the film traveling passage and then reaches the outer circumferential surface of the spool shaft 56a, becomes extremely long, which may deteriorate the convenience of the camera.

In this case, if the reduction ratios of the forwarding drive system and the rewinding drive system are equal to each other so as to be applicable to the camera according to this embodiment, the time taken for the film rewinding operation is also extremely prolonged, which similarly deteriorates the convenience of the camera.

Thus, optimizing the speed ratio between the film initial forwarding speed by the forwarding drive system and the film winding speed by the winding drive system can extremely improve the convenience of the camera. A description will be taken hereinbelow of a way to set the speed ratio between the film initial forwarding speed by the forwarding drive system and the film winding speed by the winding drive system.

As described with reference to FIG. 15, in this camera the spool rubber 56b is placed on the outer circumferential side of the spool shaft 56a. The winding speed by the spool shaft 56a is determined by the radius Rs of the outer circumferential portion of the spool rubber 56b. That is, in the case of a large radius Rs, the necessary speed difference is obtainable even in the case that the total reduction ratio iW of the winding drive system is large.

On the other hand, in the cartridge applicable to The Advanced Photo System, even in the case that the specified numbers of frames of the films differ from each other, that is, in the case that the lengths of the roll films to be housed in the cartridge are different from each other, the shaft diameter or the like therein is set so that the film is substantially tightened within the cartridge at the film initial forwarding operation. Therefore, only the reduction ratio has influence on the speed difference from the winding drive system side.

Accordingly, the threshold value is obtained for conducting the film auto-loading operation without any interference, and the condition to optimize the speed ratio at that time can be expressed as the following equation (1). That is, $$(iAL/iW) \times (2Rs/\alpha) = \beta \qquad (1)$$

where iAL: the total reduction ratio of the forwarding drive system iW: the total reduction ratio of the winding drive system Rs: the radius of the outer circumferential portion of the spool rubber 56b, i.e., the radius (mm) of the spool α: constant β: the threshold value for performing the auto-loading operation without any interference.

In this case, the condition of the tight winding is that β is above a given value. The constant α assumes a general spool diameter, and in this embodiment the constant α=15.2.

The above-mentioned equation (1) can more generally be changed to the following equation (2). That is, $$(iAL/iW) \times Rs = \gamma \qquad (2)$$

where γ designates "7.6×β".

Furthermore, in the camera according to this embodiment, Rs=α/2=7.6 is taken, and the measurement was made under five kinds of conditions taking into consideration the use environments taken for when the camera is actually in use.

The measurement results are shown in a Table 1.

TABLE 1

| Environment | Ordinary temp./ Ordinary humidity | −10° C. | 42° C./ low humidity | 42° C./ 60% | 42° C./ 90% |
|---|---|---|---|---|---|
| β min. | 0.81 | 0.71 | 0.73 | 0.88 | 1.79 |
| γ min. | 6.16 | 5.40 | 5.55 | 6.69 | 13.60 |

Further, in the Table 1, β min signifies the minimum values of β of various kinds of films: a negative film and a positive film, 15 to 40 frames in length (specified number of frames).

As shown in the Table 1, β becomes below 0.9 in the environmental range from the low-temperature environment of −10° C. in Celsius scale to the high-temperature environment of 42° C. in Celsius scale and humidity 60%.

That is, if the condition of the above-mentioned equation (1) is set so that β is above 0.9, the normal tight winding is possible under the aforesaid conditions. On the other hand, under the high-temperature and high-humidity environment of 42° C. in Celsius scale and humidity 90%, the normal tight winding is impossible.

The reason is that, under the high-temperature and high-humidity environment, the film itself becomes soft due to the temperature and loses its slipperiness owing to the humidity, and hence the tight winding becomes difficult. The minimum value of β for allowing the normal tight winding even under such a high-temperature and high-humidity environment is as follows as shown in the Table 1.

$$\beta \text{ min.} = 1.79$$

Secondly, consideration will be taken of the maximum value βMAX of β. In this camera the relationship between the total reduction ratio iAL of the forwarding drive system and the total reduction ratio iRW of the rewinding drive system is as follows as mentioned before.

$$iAL = iRW = 263.1$$

In addition, lithium batteries (two batteries) are used as the power supply battery for this camera, and with these batteries the film loading motor 48 is fully driven to conduct the rewinding operation. In this state, for example in, the case that the specified number of frames of the film is 25, the time taken for the film rewinding operation is approximately 24 seconds.

Furthermore, in the camera according to this embodiment, since as mentioned before iAL=263.1, iW=135.2, Rs=7.6 mm, α=15.2, from the above-mentioned equation (1), $$\beta = (263.1/135.2) \times ((2 \times 7.6)/15.2) = 1.95$$

That is, the setting is made to β=1.95.

Furthermore, the following Table 2 shows the measurement results of time taken for the film rewinding operation when the β value varies.

TABLE 2

| β | 1.95 | 2.50 | 3.00 | 4.00 |
|---|---|---|---|---|
| Film Rewinding Time (sec) (25 EX.) | 24 | 31 | 37 | 49 |
| Film Rewinding Time (sec) (40 EX.) | 39 | 50 | 60 | 80 |

In this Table 2, "25 EX." and "40 EX." denote the specified numbers of frames of the film, respectively. That is, "25 EX." signifies that the specified number of frame is 25 while "40 EX." means that the specified number of frames is 40.

In addition, "the time taken for the film rewinding operation" is the time required until the rewinding operation completes after the start thereof, but not including, for example, the time required for the alignment operation (which will be referred hereinafter to as a set operation) for a data disk or the like to be continuously conducted after the completion of the film rewinding operation in the cartridge applicable to The Advanced Photo System.

In the camera or the like applicable to The Advanced Photo System, it is considered that the aforesaid set operation is serialized with the film rewinding operation, and hence the film loading motor 48 rotates at the film rewinding operation for the time obtained by indiscriminately adding the time (approximately 5 seconds) required for these operations to the value in the Table 2.

As shown in the Table 2, the time taken for the rewinding operation becomes longer as the β value increases, and for example in the case that the film has 40 frames (40 EX.), if β=3.00, the time required for the film rewinding operation considerably exceeds 1 minute. Thus, when the time for the film rewinding operation is prolonged, the camera becomes very inconvenient.

On the other hand, in the case of β=2.50, the addition of the time for the set operation thereto assumes 55 seconds, and assuming that the limit of the serial operation time for the film rewinding operation the common users permit is 1 minute, the range of β in the above-mentioned equation (1) is as follows.

$$1.8 \leq \beta \leq 2.5$$

That is, if the total reduction ratio of each drive system is set so that it is settled within this range, under the actual environments it is possible to execute the film auto-loading with no problem.

If expressing this with γ in the above-mentioned equation (2), the range of γ is as follows.

$$13.6 \leq \gamma \leq 19.0$$

Although in the above description β is specified on the basis of the total reduction ratio of each of the drive systems, a description will be taken hereinbelow of the case that the conditions are determined on the basis of the difference between the film moving speeds.

Assuming that the film initial forwarding operation is conducted at the film outer diameter in a state where the film loose in the cartridge, in the camera according to this embodiment the radius Rc of the outermost circumferential portion of the film wound around the cartridge shaft on the cartridge side is Rc=approximately 8.4 mm. As described above, under the existing circumstances, this radius Rc is determined to be substantially constant irrespective of different film kinds and specified number of frames. However, in this case, consideration is taken of the following equation (3) producing a satisfaction even if the radius Rc varies at the initial forwarding. That is, $$(iAL/iW) \times (Rs/Rc) = \delta \qquad (3)$$

where
- iAL: the total reduction ratio of the forwarding drive system
- iW: the total reduction ratio of the winding drive system
- Rs: the radius (mm) of the outer circumferential portion of the spool rubber 56b
- Rc: the radius of the outermost circumferential portion of the roll film within the cartridge at the film initial forwarding operation δ: the ratio in speed between the spool side and the cartridge side which allows the loading operation without interference.

In this instance, as well as the case described above, the upper limit and the lower limit of δ, i.e., the optimal range, is obtained as follows.

$$1.6 \leq \delta \leq 2.2$$

Furthermore, when the film moving speeds, i.e., the film forwarding speed and the film winding speed at the start of the film winding are taken as VAL and VW, respectively, the above-mentioned equation (3) is changeable as follows. That is, $$VW/VAL = \delta \qquad (4)$$

According to this embodiment, as described above the range for ensuring the optimal operation is determined on the basis of the total reduction ratio of each drive system, and therefore, even in the camera for The Advanced Photo System, the more stable film auto-loading operation is securable regardless of the use environments.

Accordingly, in the case of performing the film winding operation, even in the initial state the film can surely and tightly wound around the spool shaft 56a and the film loading is possible at a stable speed, thus achieving an extremely stable magnetic recording operation.

Besides, the respective components are disposed to contribute to the size reduction, thus developing excellent controllability and mobility of the camera.

In this invention, it is apparent that working modes different in a wide range can be formed on the basis of this invention without departing from the spirit and scope of the invention. This invention is not restricted by any specific embodiment except as maybe limited by the appended claims.

What is claimed is:

1. A film loading device of a camera using a film cartridge in which a rolled film including a tip portion thereof is fully contained within a cartridge housing, comprising:

a film loading motor;

a film winding gear train for reducing an output speed of said motor according to a first reduction ratio;

a film take-up spool driven by said film winding gear train;

a film forwarding gear train for reducing an output speed of said motor according to a second reduction ratio;

a member driven by said film forwarding gear train for forwarding film from said film cartridge to said take-up spool;

a clutch for releasing transfer of a driving force of said motor to said film forwarding gear train; and wherein a relationship between the reduction ratio of said film winding gear train and the reduction ratio of said film forwarding gear train is set as follows:

$$(iAL/iW) \times Rs = \gamma$$

$$\gamma \geq 13.6$$

where iAL: the reduction ratio of said film forwarding gear train;

iW: the reduction ratio of said film winding gear train;

Rs: a radius (mm) of said film take-up spool.

2. A camera as defined in claim 1, wherein said value γ is determined to be $\gamma \leq 19.0$.

3. A camera as defined in claim 1, further comprising magnetic recording means for magnetically recording information on photography in a film as it is wound on said take-up spool.

4. A film loading device of camera using a film cartridge in which a rolled film including a tip portion thereof is fully contained within a cartridge housing, comprising:

a film forwarding mechanism driven through a first reduction system by rotation of a motor in one direction; and a film take-up mechanism having a film take-up spool driven through a second reduction system by the rotation of said motor in said one direction, wherein a reduction ratio of said first reduction system and a reduction ratio of said second reduction system are set as follows:

$$(iAL/iW) \times Rs \geq 13.6$$

where iAL: the reduction ratio of said first reduction system;

iW: the reduction ratio of said second reduction system; and

Rs: a radius (mm) of said film take-up spool.

5. A camera as defined in claim 4, wherein the relationship among iAL, iW and Rs is determined as follows:

$$13.6 \leq (iAL/iW) \times Rs \leq 19.0.$$

* * * * *

UNITED STATES PATENT AND TRADEMARK OFFICE
CERTIFICATE OF CORRECTION

PATENT NO. : 5,805,943
DATED : September 8, 1998
INVENTOR(S) : Terada et al.

It is certified that error appears in the above-identified patent and that said Letters Patent is hereby corrected as shown below:

Column 9, line 9, delete "to".

Column 16, line 18, delete "providing given" and insert instead --provided--.

Signed and Sealed this

Twenty-eighth Day of March, 2000

Attest:

Q. TODD DICKINSON

*Attesting Officer*   *Commissioner of Patents and Trademarks*